US010623294B2

(12) United States Patent
Heliker et al.

(10) Patent No.: US 10,623,294 B2
(45) Date of Patent: Apr. 14, 2020

(54) LOCAL ANALYTICS DEVICE

(71) Applicant: Uptake Technologies, Inc., Chicago, IL (US)

(72) Inventors: Brett Heliker, Chicago, IL (US); Brad Nicholas, Wheaton, IL (US)

(73) Assignee: Uptake Technologies, Inc., Chicago, IL (US)

( * ) Notice: Subject to any disclaimer, the term of this patent is extended or adjusted under 35 U.S.C. 154(b) by 368 days.

(21) Appl. No.: 15/371,638

(22) Filed: Dec. 7, 2016

(65) Prior Publication Data

US 2017/0163515 A1 Jun. 8, 2017

Related U.S. Application Data

(60) Provisional application No. 62/264,306, filed on Dec. 7, 2015.

(51) Int. Cl.
*G06F 11/30* (2006.01)
*H04L 12/26* (2006.01)
(Continued)

(52) U.S. Cl.
CPC .............. *H04L 43/14* (2013.01); *G06F 1/266* (2013.01); *G06F 11/3058* (2013.01);
(Continued)

(58) Field of Classification Search
CPC ............ G06F 11/3058; G06F 11/2015; G06F 11/0784; G06F 11/0787

See application file for complete search history.

(56) References Cited

U.S. PATENT DOCUMENTS 5,566,092 A      10/1996  Wang et al.
5,566,339 A  *   10/1996  Perholtz ................... G06F 1/26
                                                           713/340

(Continued)

FOREIGN PATENT DOCUMENTS

WO      2010082322 A1      7/2010
WO      2011117570         9/2011
(Continued)

OTHER PUBLICATIONS

International Searching Authority, Written Opinion dated Mar. 20, 2017, issued in connection with International Application No. PCT/US2016/065354, filed on Dec. 7, 2016, 5 pages.

(Continued)

*Primary Examiner* — Yolanda L Wilson
(74) *Attorney, Agent, or Firm* — Lee Sullivan Shea & Smith LLP

(57) ABSTRACT

Disclosed herein is an improved local analytics device that includes a single-board computer with a high-capacity processing unit, a remote network interface configured to wirelessly communicate with a remote computing system, a local network interface configured to wirelessly communicate with a remote computing system, a secondary power source, and an asset interface that may include (i) a communication connector that enables the local analytics device to be coupled to the asset's on-board systems via a single cable that carries both data and power, (ii) an asset communication subsystem configured to manage data communication with an asset's on-board systems, and (iii) a power management subsystem configured to receive and manage power from the asset's on-board systems.

19 Claims, 9 Drawing Sheets

(51) Int. Cl.
*H04L 29/08* (2006.01)
*G06F 1/26* (2006.01)
*G06F 13/42* (2006.01)
*H04L 12/40* (2006.01)
*H04L 29/06* (2006.01)

(52) U.S. Cl.
CPC .... *G06F 13/4282* (2013.01); *H04L 12/40078* (2013.01); *H04L 67/02* (2013.01); *H04L 67/10* (2013.01); *H04L 67/125* (2013.01); *H04L 67/42* (2013.01); *H04L 2012/40215* (2013.01)

(56) References Cited

U.S. PATENT DOCUMENTS

| | | | |
|---|---|---|---|
| 5,633,800 A | 5/1997 | Bankert et al. | |
| 6,256,594 B1 | 7/2001 | Yamamoto et al. | |
| 6,336,065 B1 | 1/2002 | Gibson et al. | |
| 6,442,542 B1 | 8/2002 | Ramani et al. | |
| 6,473,659 B1 | 10/2002 | Shah et al. | |
| 6,622,264 B1 | 9/2003 | Bliley et al. | |
| 6,634,000 B1 | 10/2003 | Jammu et al. | |
| 6,643,600 B2 | 11/2003 | Yanosik et al. | |
| 6,650,949 B1 | 11/2003 | Fera et al. | |
| 6,725,398 B1 | 4/2004 | Varma et al. | |
| 6,760,631 B1 | 7/2004 | Berkowitz et al. | |
| 6,775,641 B2 | 8/2004 | Wegerich et al. | |
| 6,799,154 B1 | 9/2004 | Aragones et al. | |
| 6,823,253 B2 | 11/2004 | Brunell | |
| 6,826,714 B2* | 11/2004 | Coffey | G06F 11/0727 702/188 |
| 6,859,739 B2 | 2/2005 | Wegerich et al. | |
| 6,892,163 B1 | 5/2005 | Herzog et al. | |
| 6,947,797 B2 | 9/2005 | Dean et al. | |
| 6,952,662 B2 | 10/2005 | Wegerich et al. | |
| 6,957,172 B2 | 10/2005 | Wegerich | |
| 6,975,962 B2 | 12/2005 | Wegerich et al. | |
| 7,020,595 B1 | 3/2006 | Adibhatla et al. | |
| 7,082,379 B1 | 7/2006 | Bickford et al. | |
| 7,100,084 B2 | 8/2006 | Unkle et al. | |
| 7,107,491 B2 | 9/2006 | Graichen et al. | |
| 7,127,371 B2 | 10/2006 | Duckert et al. | |
| 7,233,886 B2 | 6/2007 | Wegerich et al. | |
| 7,280,941 B2 | 10/2007 | Bonanni et al. | |
| 7,308,385 B2 | 12/2007 | Wegerich et al. | |
| 7,373,283 B2 | 5/2008 | Herzog et al. | |
| 7,403,869 B2 | 7/2008 | Wegerich et al. | |
| 7,409,320 B2 | 8/2008 | Wegerich | |
| 7,415,382 B1 | 8/2008 | Bickford et al. | |
| 7,428,478 B2 | 9/2008 | Aragones | |
| 7,447,666 B2 | 11/2008 | Wang | |
| 7,457,693 B2 | 11/2008 | Olsen et al. | |
| 7,457,732 B2 | 11/2008 | Aragones et al. | |
| 7,509,235 B2 | 3/2009 | Bonissone et al. | |
| 7,536,364 B2 | 5/2009 | Subbu et al. | |
| 7,539,597 B2 | 5/2009 | Wegerich et al. | |
| 7,548,830 B2 | 6/2009 | Goebel et al. | |
| 7,634,384 B2 | 12/2009 | Eryurek et al. | |
| 7,640,145 B2 | 12/2009 | Wegerich et al. | |
| 7,660,705 B1 | 2/2010 | Meek et al. | |
| 7,725,293 B2 | 5/2010 | Bonissone et al. | |
| 7,739,096 B2 | 6/2010 | Wegerich et al. | |
| 7,756,678 B2 | 7/2010 | Bonissone et al. | |
| 7,809,992 B2* | 10/2010 | Kulidjian | G06F 11/0757 713/340 |
| 7,822,578 B2 | 10/2010 | Kasztenny et al. | |
| 7,869,908 B2 | 1/2011 | Walker | |
| 7,919,940 B2 | 4/2011 | Miller et al. | |
| 7,941,701 B2 | 5/2011 | Wegerich et al. | |
| 7,962,240 B2 | 6/2011 | Morrison et al. | |
| 8,024,069 B2 | 9/2011 | Miller et al. | |
| 8,050,800 B2 | 11/2011 | Miller et al. | |
| 8,145,578 B2 | 3/2012 | Pershing et al. | |
| 8,229,769 B1 | 7/2012 | Hopkins | |
| 8,234,420 B2 | 7/2012 | Lueckenbach et al. | |
| 8,239,170 B2 | 8/2012 | Wegerich | |
| 8,275,577 B2 | 9/2012 | Herzog | |
| 8,285,402 B2 | 10/2012 | Lueckenbach et al. | |
| 8,311,774 B2 | 11/2012 | Hines | |
| 8,352,216 B2 | 1/2013 | Subbu et al. | |
| 8,532,795 B2 | 9/2013 | Adavi et al. | |
| 8,533,018 B2 | 9/2013 | Miwa et al. | |
| 8,560,494 B1 | 10/2013 | Downing et al. | |
| 8,620,618 B2 | 12/2013 | Eryurek et al. | |
| 8,620,853 B2 | 12/2013 | Herzog | |
| 8,626,385 B2 | 1/2014 | Humphrey | |
| 8,645,276 B2 | 2/2014 | Wong et al. | |
| 8,660,980 B2 | 2/2014 | Herzog | |
| 8,689,108 B1 | 4/2014 | Duffield et al. | |
| 8,707,095 B2* | 4/2014 | Grimshaw | G06F 11/2015 714/14 |
| 8,713,467 B1 | 4/2014 | Goldenberg et al. | |
| 8,786,605 B1 | 7/2014 | Curtis et al. | |
| 8,799,799 B1 | 8/2014 | Cervelli et al. | |
| 8,812,960 B1 | 8/2014 | Sun et al. | |
| 8,832,594 B1 | 9/2014 | Thompson et al. | |
| 8,850,000 B2 | 9/2014 | Collins et al. | |
| 8,862,938 B2 | 10/2014 | Souvannarath | |
| 8,868,537 B1 | 10/2014 | Colgrove et al. | |
| 8,886,601 B1 | 11/2014 | Landau et al. | |
| 8,909,656 B2 | 12/2014 | Kumar et al. | |
| 8,917,274 B2 | 12/2014 | Ma et al. | |
| 8,918,246 B2 | 12/2014 | Friend | |
| 8,924,429 B1 | 12/2014 | Fisher et al. | |
| 8,935,201 B1 | 1/2015 | Fisher et al. | |
| 8,937,619 B2 | 1/2015 | Sharma et al. | |
| 8,938,686 B1 | 1/2015 | Erenrich et al. | |
| 9,450,833 B2* | 9/2016 | Griffith | H04L 43/0817 |
| 9,785,505 B1* | 10/2017 | Narzisi | G06F 11/1451 |
| 2002/0005526 A1* | 1/2002 | Czech | H01L 27/0255 257/173 |
| 2002/0091972 A1 | 7/2002 | Harris et al. | |
| 2002/0152056 A1 | 10/2002 | Herzog et al. | |
| 2003/0055666 A1 | 3/2003 | Roddy et al. | |
| 2003/0126258 A1 | 7/2003 | Conkright et al. | |
| 2003/0200017 A1* | 10/2003 | Capps | H04L 12/12 701/36 |
| 2004/0181712 A1 | 9/2004 | Taniguchi et al. | |
| 2004/0243636 A1 | 12/2004 | Hasiewicz et al. | |
| 2005/0119905 A1 | 6/2005 | Wong et al. | |
| 2005/0222747 A1 | 10/2005 | Vhora et al. | |
| 2005/0283343 A1* | 12/2005 | Cromer | G06F 11/0778 702/189 |
| 2006/0132943 A1* | 6/2006 | Suzuki | B60R 1/10 359/879 |
| 2007/0263628 A1 | 11/2007 | Axelsson et al. | |
| 2008/0059080 A1 | 3/2008 | Greiner et al. | |
| 2008/0059120 A1 | 3/2008 | Xiao et al. | |
| 2008/0158915 A1* | 7/2008 | Williams | H02M 3/07 363/21.06 |
| 2009/0006010 A1* | 1/2009 | Van Sloun | G01R 31/3662 702/57 |
| 2009/0204232 A1 | 8/2009 | Guru et al. | |
| 2009/0296704 A1* | 12/2009 | Kim | H04L 45/20 370/389 |
| 2011/0181115 A1* | 7/2011 | Ivanov | H02M 7/219 307/72 |
| 2011/0258044 A1* | 10/2011 | Kargupta | G06Q 10/08 705/14.49 |
| 2012/0258627 A1* | 10/2012 | Huang | B60R 16/0232 439/620.21 |
| 2012/0271612 A1 | 10/2012 | Barsoum et al. | |
| 2012/0310597 A1 | 12/2012 | Uchiyama et al. | |
| 2013/0010610 A1 | 1/2013 | Karthikeyan et al. | |
| 2013/0018542 A1* | 1/2013 | Chinnadurai | G06F 1/26 701/31.4 |
| 2013/0024416 A1 | 1/2013 | Herzog | |
| 2013/0198553 A1* | 8/2013 | Oguro | G06F 1/305 713/340 |
| 2013/0283773 A1 | 10/2013 | Hague | |
| 2013/0325502 A1 | 12/2013 | Robicsek et al. | |
| 2014/0012886 A1 | 1/2014 | Downing et al. | |
| 2014/0032132 A1 | 1/2014 | Stratton et al. | |

(56) References Cited

U.S. PATENT DOCUMENTS

| | | |
|---|---|---|
| 2014/0060030 A1 | 3/2014 | Ma et al. |
| 2014/0089035 A1 | 3/2014 | Jericho et al. |
| 2014/0105481 A1 | 4/2014 | Hasselbusch et al. |
| 2014/0121868 A1 | 5/2014 | Zhang et al. |
| 2014/0156136 A1 | 6/2014 | Ying |
| 2014/0169398 A1 | 6/2014 | Arndt et al. |
| 2014/0170617 A1 | 6/2014 | Johnson et al. |
| 2014/0181562 A1* | 6/2014 | Das ................. G06F 1/206 713/324 |
| 2014/0184643 A1 | 7/2014 | Friend |
| 2014/0222355 A1 | 8/2014 | Cheim et al. |
| 2014/0330600 A1 | 11/2014 | Candas et al. |
| 2014/0330749 A1 | 11/2014 | Candas et al. |
| 2014/0351642 A1 | 11/2014 | Bates et al. |
| 2014/0357295 A1 | 12/2014 | Skomra et al. |
| 2014/0358601 A1 | 12/2014 | Smiley et al. |
| 2015/0046870 A1 | 2/2015 | Goldenberg et al. |
| 2015/0262060 A1 | 9/2015 | Husain et al. |
| 2015/0338281 A1* | 11/2015 | Ross ................. G01K 3/14 236/44 A |
| 2015/0355651 A1* | 12/2015 | Balakrishnan ......... G05B 15/02 700/299 |
| 2016/0124785 A1* | 5/2016 | Ji ................. G06F 11/079 714/49 |

FOREIGN PATENT DOCUMENTS

| | | |
|---|---|---|
| WO | 2013034420 | 3/2013 |
| WO | 2014145977 | 9/2014 |
| WO | 2014205497 | 12/2014 |

OTHER PUBLICATIONS

International Search Report for Application No. PCT/US2016/065354, dated Mar. 20, 2017, 8 pages.

Biswas, "Redundancy-based Approaches in Wireless Multihop Network Design", PhD Dissertation Submitted to Graduate Faculty of North Carolina State University (2014).

Isermann, "Model-based Fault Detection and Diagnosis—Status and Applications", Institute of Automatic Control, Darmstadt University of Technology (2004).

Narasimhan et al, "Combining Model-Based and Feature-Driven Diagnosis Approaches—A Case Study on Electromechanical Actuators", 21st International Workshop on Principles of Diagnosis (2010).

Prentzas et al, Categorizing Approaches Combining Rule-Based and Case-Based Reasoning.

Infor M3 Enterprise Management System, Infor.com (2014).

Infor Equipment, Infor.com (2012).

Infor Introduces Next-Generation Solution for Equipment Dealers and Service Providers, Infor.com (Feb. 20, 2014).

Infor Equipment for Rental, Infor.com (2013).

Waltermire et al, Applying the Continuous Monitoring Technical Reference Model to the Asset, Configuration, and Vulnerability Management Domains (Draft), NIST (Jan. 2012).

* cited by examiner

LOCAL ANALYTICS DEVICE

CROSS-REFERENCE TO RELATED APPLICATIONS

This application claims priority to U.S. Provisional Patent App. No. 62/264,306, filed on Dec. 7, 2015, entitled "Interface for Telematics Device." The entire contents of the 62/264,306 application are incorporated herein by reference.

BACKGROUND

Today, machines (also referred to herein as "assets") are ubiquitous in many industries. From locomotives that transfer cargo across countries to medical equipment that helps nurses and doctors to save lives, assets serve an important role in everyday life. Depending on the role that an asset serves, its complexity, and cost, may vary. For instance, some assets may include multiple subsystems that must operate in harmony for the asset to function properly (e.g., an engine, transmission, etc. of a locomotive).

Because of the key role that assets play in everyday life, it is desirable for assets to be repairable with limited downtime. Accordingly, some have developed mechanisms to monitor and detect abnormal conditions within an asset to facilitate repairing the asset, perhaps with minimal downtime.

Overview

The current approach for monitoring assets generally involves an on-asset computer that receives signals from various sensors and/or actuators distributed throughout an asset that monitor the operating conditions of the asset. As one representative example, if the asset is a locomotive, the sensors and/or actuators may monitor parameters such as temperatures, voltages, and speeds, among other examples. If sensor and/or actuator signals from one or more of these devices reach certain values, the on-asset computer may then generate an abnormal-condition indicator, such as a "fault code," which is an indication that an abnormal condition has occurred within the asset.

In general, an abnormal condition may be a defect at an asset or component thereof, which may lead to a failure of the asset and/or component. As such, an abnormal condition may be associated with a given failure, or perhaps multiple failures, in that the abnormal condition is symptomatic of the given failure or failures. In practice, a user typically defines the sensors and respective sensor values associated with each abnormal-condition indicator. That is, the user defines an asset's "normal" operating conditions (e.g., those that do not trigger fault codes) and "abnormal" operating conditions (e.g., those that trigger fault codes).

The on-asset computer may also be configured to send sensor and/or actuator data (e.g., "signal data") and abnormal-condition indicators to a remote location for further analysis. In turn, an organization that is interested in monitoring and analyzing assets in operation may deploy a remote computing system (e.g., an asset data platform) that is configured to receive and analyze such data and then potentially take action based on that data. For example, a remote computing system may input data received from assets into predictive models that enable the remote computing system to predict the likelihood of particular events (e.g., failures) occurring at the asset within a particular period of time in the future. As another example, a remote computing system may generate user notifications based on data received from assets, which may enable a user to take preventative and/or remedial action at the asset (e.g., assigning a mechanic or the like to evaluate and potentially repair the asset).

While current asset-monitoring systems are generally effective at triggering abnormal-condition indicators, such systems are typically reactionary. That is, by the time the asset-monitoring system triggers an indicator, a failure within the asset may have already occurred (or is about to occur), which may lead to costly downtime, among other disadvantages. Additionally, due to the simplistic nature of on-asset computers, analysis of the data generated at the asset typically must be performed at a remote computing system. This requires the asset to transmit the data to the remote computing system over a network, which may increase cost, introduce undesirable delay (e.g., due to network latency), and/or be infeasible when the asset moves outside of coverage of a communication network. Further still, due to the nature of local diagnostic tools stored on assets, current diagnosis procedures tend to be inefficient and cumbersome because a mechanic is required to cause the asset to utilize such tools.

The example systems, devices, and methods disclosed herein seek to help address one or more of these issues. In example implementations, one or more assets may be equipped with a local analytics device, which may enable an asset to perform more complex operations than are possible with the asset's typical on-asset computer, which may reduce the asset's reliance on a remote computing system to perform such operations.

For instance, a local analytics device may enable an asset (as opposed to a remote computing system) to execute a predictive model and corresponding workflow, which may cause an asset to monitor certain operating conditions and when certain conditions exist, modify a behavior that may help facilitate preventing an occurrence of a particular event. Specifically, a predictive model may receive as inputs data from a particular set of asset sensors and/or actuators and output a likelihood that one or more particular events could occur at the asset within a particular period of time in the future, and a workflow may involve one or more operations that are performed based on the likelihood of the one or more particular events that is output by the model. A local analytics device may enable an asset to perform other complex operations as well.

There are many factors that should be considered when designing a local analytics device for an asset, including processing capability, size, durability, ease of installation, tolerance to environmental conditions, manufacturing cost and time, etc. Failure to take one or more of these factors into account may result in a local analytics device that is not practical and/or usable.

Disclosed herein is an improved local analytics device that properly balances these factors. According to an embodiment, the disclosed local analytics device may include a single-board computer with a high-capacity processing unit, a remote network interface configured to facilitate communication with a remote computing system, a local network interface configured to facilitate communication with one or more local devices, an asset interface that enables the local analytics device to both engage in data communication with an asset and also draw power from the asset, a secondary power source (e.g., a backup battery), and one or more sensors, all of which may be packaged together into a single housing. In practice, this housing may be designed to allow the local analytics device to be easily installed without the need for professional installation or extra tools.

The local analytics device's single-board computer may take various forms. In some embodiments, the single-board computer may comprise a general-purpose computer that has been repurposed for use in a specific-purpose device such as a local analytics device of an industrial asset. As noted above, the single-board computer may include a high-capacity processing unit, which may be a processing unit having increased clock speed and a multi-core processor to equip the local analytics device with enough processing power to locally perform advanced analytics and associated operations. In addition, the single-board computer may include other components, such as data storage and/or one or more interfaces for communicating with other components of the local analytics device. The local analytics device's single-board computer may take other forms as well.

Further, the local analytics device's remote network interface may take various forms. In general, the remote network interface may comprise at least one network interface that facilitates wireless communication between the local analytics device and a remote computing system, such as an asset data platform. For instance, the remote network interface may include a cellular-network interface and/or a satellite-communication interface, among other examples. The local analytics device's remote network interface may take other forms as well.

Likewise, the local analytics device's local network interface may take various forms. In general, the local network interface may comprise at least one network interface that facilitates wireless and/or wired communication between the local analytics device and one or more local devices, such as mobile computing devices (e.g., mobile phones) located in proximity to the local analytics device. For instance, the local network interface may include a Wi-Fi interface, Bluetooth® interface, and/or an Ethernet interface, among other examples. The local analytics device's local network interface may take other forms as well.

Further yet, the local analytics device's asset interface may take various forms. In general, the asset interface may include hardware and/or software that enables the local analytics device to both engage in data communication with an asset and also draw power from the asset. This asset interface may be configured according to various technologies and/or protocols for interfacing with an asset, examples of which may include Controller Area Network (CAN) interface technology, Modbus interface technology, Open Platform Communications (OPC) interface technology, Ethernet interface technology, Universal Serial Bus (USB) interface technology, and technology for wirelessly communicating with assets over industrial, scientific and medical (ISM) radio bands such as the 433 MHz ISM band.

In one embodiment, the asset interface may include (i) a communication connector that enables the local analytics device to be coupled to the asset's on-board systems via a single cable that carries both data and power, (ii) an asset communication subsystem configured to manage data communication with an asset's on-board systems, and (iii) a power management subsystem configured to receive and manage power from the asset's on-board systems. Each of these asset-interface components may take various forms.

In general, the asset communication subsystem may include hardware and/or software components that are configured to facilitate data communication between the local analytics device's single-board computer and the asset's on-board systems via the communication connector. For example, the asset communication subsystem may be configured to receive operating data from an asset asset's on-board systems via the communication connector, prepare the operating data for receipt by the single-board computer, and then pass the operating data to the single-board computer (which may then use the operating data as a basis to locally perform advanced analytics, workflows, or the like). As another example, the asset communication subsystem may be configured to receive instructions from the single-board computer, prepare the instructions for receipt by the asset's on-board systems, and then send the instructions to the asset's on-board systems via the communication connector.

In turn, the power management subsystem may include hardware and/or software components that are configured to receive power supplied by the asset's on-board systems, "condition" the received power so that it can be used by the single-board computer, and then supply the power to the single-board computer. Such components may include power converters and regulators to protect the single-board computer from abnormal power system conditions associated with the asset, among other examples.

In addition, the power management subsystem may also include hardware and/or software components that are configured to switch the local analytics device's power source from the power supplied by the asset's on-board systems to the secondary power source that is internal to the local analytics device (e.g., one or more internal batteries). For example, the power management subsystem may include a power path management component that is configured to switch power consumption from the asset to the secondary power source in certain circumstances, such as when no power is being supplied by the asset or abnormal power conditions are detected. Subsequent to a switch in the local analytics device's power source, the single-board computer may also be configured to take various other actions, such as notifying a user of the switch and/or initiating graceful shutdown of the local analytics device.

In some embodiments, the asset interface's components may be implemented on a separate circuit board that couples to the single-board computer. In other embodiments, the asset interface's components may be implemented as part of the same circuit board as the single-board computer. Other example implementations are possible.

Still further, the local analytics device's one or more sensors may take various forms. In general, the one or more sensors may be configured to measure attributes of the local analytics device, such as location and/or movement of the local analytics device, and then transmit electrical signals indicative of such measured attributes (e.g., sensor data) to the single-board computer. In turn the single-board computer may use such sensor data for various purposes related to the operation of the local analytics device.

Accordingly, in one aspect, disclosed herein is a local analytics device comprising: (a) a single-board computer comprising a processing unit and data storage, (b) a remote network interface configured to facilitate communication between the local analytics device and a remote computing system, (c) a local network interface configured to facilitate communication between the local analytics device and one or more local devices, (d) a secondary power source configured to supply power to the single-board computer, and (e) an asset interface coupled to the single-board computer, wherein the asset interface comprises (i) a communication connector configured to couple the local analytics device to an asset via a single cable, (ii) an asset communication subsystem configured to manage data communication between the single-board computer and the asset, and (iii) a power management subsystem configured to manage the power supplied to the single-board computer by selecting between a power source supplied by the asset and the secondary power source, wherein the single-board computer, the remote network interface, the local network interface, the secondary power source, and the asset interface are packaged into a single housing. Each of these components may take various forms.

One of ordinary skill in the art will appreciate these as well as numerous other aspects in reading the following disclosure.

DETAILED DESCRIPTION

The following disclosure makes reference to the accompanying figures and several exemplary embodiments. One of ordinary skill in the art will understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example Network Configuration

Figure 1:
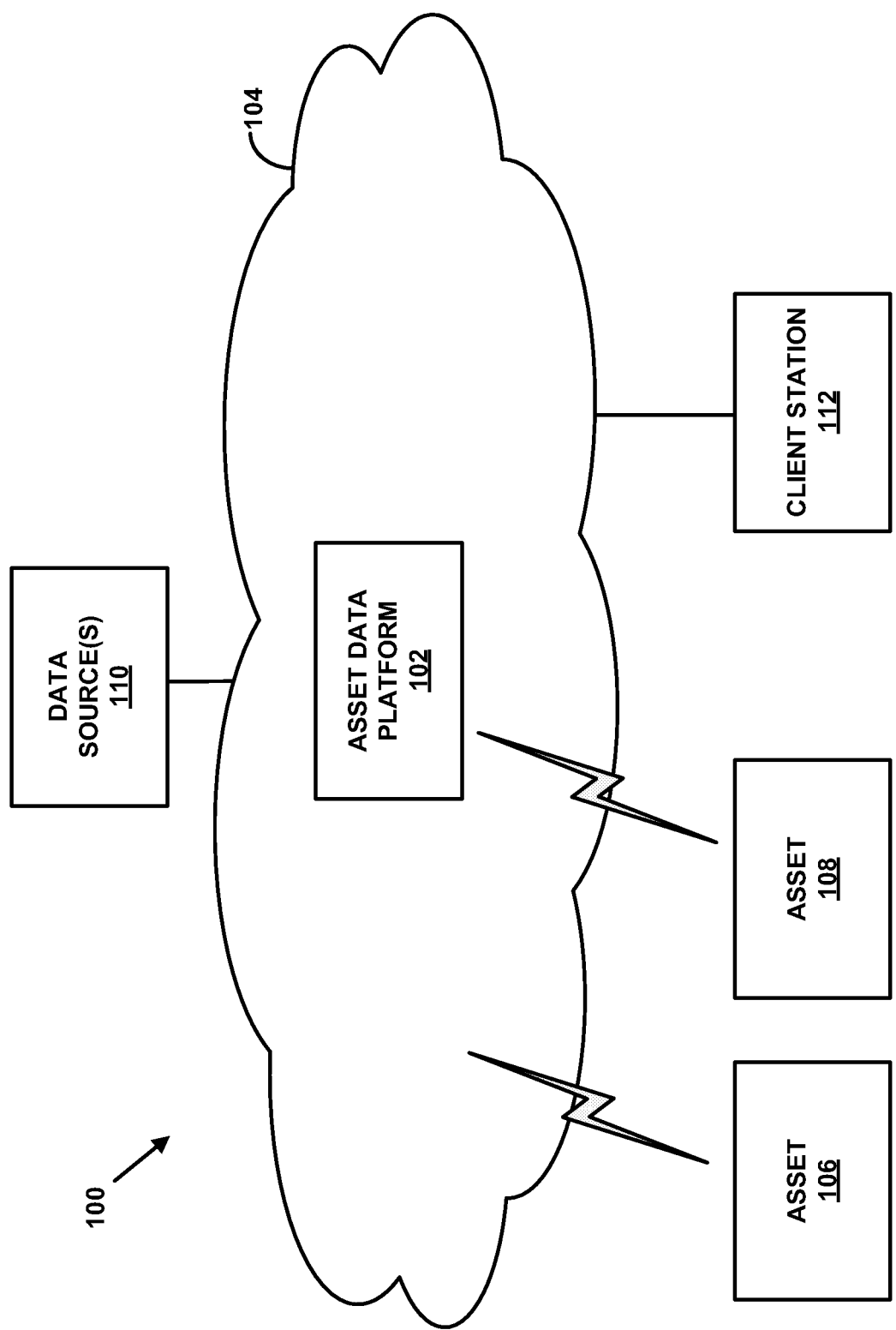
FIG. 1 depicts an example network configuration in which example embodiments may be implemented.

Turning now to the figures, FIG. 1 depicts an example network configuration 100 in which example embodiments may be implemented. As shown, the network configuration 100 includes at its core a remote computing system 102 that may be configured as an asset data platform, which may communicate via a communication network 104 with one or more assets, such as representative assets 106 and 108, one or more data sources, such as representative data source 110, and one or more output systems, such as representative client station 112. It should be understood that the network configuration may include various other systems as well.

Broadly speaking, the asset data platform 102 (sometimes referred to herein as an "asset condition monitoring system") may take the form of one or more computer systems that are configured to receive, ingest, process, analyze, and/or provide access to asset-related data. For instance, a platform may include one or more servers (or the like) having hardware components and software components that are configured to carry out one or more of the functions disclosed herein for receiving, ingesting, processing, analyzing, and/or providing access to asset-related data. Additionally, a platform may include one or more user interface components that enable a platform user to interface with the platform. In practice, these computing systems may be located in a single physical location or distributed amongst a plurality of locations, and may be communicatively linked via a system bus, a communication network (e.g., a private network), or some other connection mechanism. Further, the platform may be arranged to receive and transmit data according to dataflow technology, such as TPL Dataflow or NiFi, among other examples. The platform may take other forms as well. The asset data platform 102 is discussed in further detail below with reference to FIG. 4.

As shown in FIG. 1, the asset data platform 102 may be configured to communicate, via the communication network 104, with the one or more assets, data sources, and/or output systems in the network configuration 100. For example, the asset data platform 102 may receive asset-related data, via the communication network 104, that is sent by one or more assets and/or data sources. As another example, the asset data platform 102 may transmit asset-related data and/or commands, via the communication network 104, for receipt by an output system, such as a client station, a work-order system, a parts-ordering system, etc. The asset data platform 102 may engage in other types of communication via the communication network 104 as well.

In general, the communication network 104 may include one or more computing systems and network infrastructure configured to facilitate transferring data between asset data platform 102 and the one or more assets, data sources, and/or output systems in the network configuration 100. The communication network 104 may be or may include one or more Wide-Area Networks (WANs) and/or Local-Area Networks (LANs), which may be wired and/or wireless and may support secure communication. In some examples, the communication network 104 may include one or more cellular networks and/or the Internet, among other networks. The communication network 104 may operate according to one or more communication protocols, such as LTE, CDMA, GSM, LPWAN, WiFi, Bluetooth, Ethernet, HTTP/S, TCP, CoAP/DTLS and the like. Although the communication network 104 is shown as a single network, it should be understood that the communication network 104 may include multiple, distinct networks that are themselves communicatively linked. Further, in example cases, the communication network 104 may facilitate secure communications between network components (e.g., via encryption or other security measures). The communication network 104 could take other forms as well.

Further, although not shown, the communication path between the asset data platform 102 and the one or more assets, data sources, and/or output systems may include one or more intermediate systems. For example, the one or more assets and/or data sources may send asset-related data to one or more intermediary systems, such as an asset gateway or an organization's existing platform (not shown), and the asset data platform 102 may then be configured to receive the asset-related data from the one or more intermediary systems. As another example, the asset data platform 102 may communicate with an output system via one or more intermediary systems, such as a host server (not shown). Many other configurations are also possible.

In general, the assets 106 and 108 may take the form of any device configured to perform one or more operations (which may be defined based on the field) and may also include equipment configured to transmit data indicative of the asset's attributes, such as the operation and/or configuration of the given asset. This data may take various forms, examples of which may include signal data (e.g., sensor/ actuator data), fault data (e.g., fault codes), location data for the asset, identifying data for the asset, etc.

Representative examples of asset types may include transportation machines (e.g., locomotives, aircrafts, passenger vehicles, semi-trailer trucks, ships, etc.), industrial machines (e.g., mining equipment, construction equipment, processing equipment, assembly equipment, etc.), medical machines (e.g., medical imaging equipment, surgical equipment, medical monitoring systems, medical laboratory equipment, etc.), utility machines (e.g., turbines, solar farms, etc.), and unmanned aerial vehicles, among other examples. Additionally, the assets of each given type may have various different configurations (e.g., brand, make, model, firmware version, etc.).

As such, in some examples, the assets 106 and 108 may each be of the same type (e.g., a fleet of locomotives or aircrafts, a group of wind turbines, a pool of milling machines, or a set of magnetic resonance imagining (MRI) machines, among other examples) and perhaps may have the same configuration (e.g., the same brand, make, model, firmware version, etc.). In other examples, the assets 106 and 108 may have different asset types or different configurations (e.g., different brands, makes, models, and/or firmware versions). For instance, assets 106 and 108 may be different pieces of equipment at a job site (e.g., an excavation site) or a production facility, among numerous other examples. Those of ordinary skill in the art will appreciate that these are but a few examples of assets and that numerous others are possible and contemplated herein.

Depending on an asset's type and/or configuration, the asset may also include one or more subsystems configured to perform one or more respective operations. For example, in the context of transportation assets, subsystems may include engines, transmissions, drivetrains, fuel systems, battery systems, exhaust systems, braking systems, electrical systems, signal processing systems, generators, gear boxes, rotors, and hydraulic systems, among numerous other examples. In practice, an asset's multiple subsystems may operate in parallel or sequentially in order for an asset to operate. Representative assets are discussed in further detail below with reference to FIG. 2.

In general, the data source 110 may be or include one or more computing systems configured to collect, store, and/or provide data that is related to the assets or is otherwise relevant to the functions performed by the asset data platform 102. For example, the data source 110 may collect and provide operating data that originates from the assets (e.g., historical operating data), in which case the data source 110 may serve as an alternative source for such asset operating data. As another example, the data source 110 may be configured to provide data that does not originate from the assets, which may be referred to herein as "external data." Such a data source may take various forms.

In one implementation, the data source 110 could take the form of an environment data source that is configured to provide data indicating some characteristic of the environment in which assets are operated. Examples of environment data sources include weather-data servers, global navigation satellite systems (GNSS) servers, map-data servers, and topography-data servers that provide information regarding natural and artificial features of a given area, among other examples.

In another implementation, the data source 110 could take the form of asset-management data source that provides data indicating events or statuses of entities (e.g., other assets) that may affect the operation or maintenance of assets (e.g., when and where an asset may operate or receive maintenance). Examples of asset-management data sources include asset-maintenance servers that provide information regarding inspections, maintenance, services, and/or repairs that have been performed and/or are scheduled to be performed on assets, traffic-data servers that provide information regarding air, water, and/or ground traffic, asset-schedule servers that provide information regarding expected routes and/or locations of assets on particular dates and/or at particular times, defect detector systems (also known as "hotbox" detectors) that provide information regarding one or more operating conditions of an asset that passes in proximity to the defect detector system, and part-supplier servers that provide information regarding parts that particular suppliers have in stock and prices thereof, among other examples.

The data source 110 may also take other forms, examples of which may include fluid analysis servers that provide information regarding the results of fluid analyses and power-grid servers that provide information regarding electricity consumption, among other examples. One of ordinary skill in the art will appreciate that these are but a few examples of data sources and that numerous others are possible.

In practice, the asset data platform 102 may receive data from the data source 110 by "subscribing" to a service provided by the data source. However, the asset data platform 102 may receive data from the data source 110 in other manners as well.

The client station 112 may take the form of a computing system or device configured to access and enable a user to interact with the asset data platform 102. To facilitate this, the client station may include hardware components such as a user interface, a network interface, a processor, and data storage, among other components. Additionally, the client station may be configured with software components that enable interaction with the asset data platform 102, such as a web browser that is capable of accessing a web application provided by the asset data platform 102 or a native client application associated with the asset data platform 102, among other examples. Representative examples of client stations may include a desktop computer, a laptop, a netbook, a tablet, a smartphone, a personal digital assistant (PDA), or any other such device now known or later developed.

Other examples of output systems may take include a work-order system configured to output a request for a mechanic or the like to repair an asset or a parts-ordering system configured to place an order for a part of an asset and output a receipt thereof, among others.

It should be understood that the network configuration 100 is one example of a network in which embodiments described herein may be implemented. Numerous other arrangements are possible and contemplated herein. For instance, other network configurations may include additional components not pictured and/or more or less of the pictured components.

II. Example Asset

Figure 2:
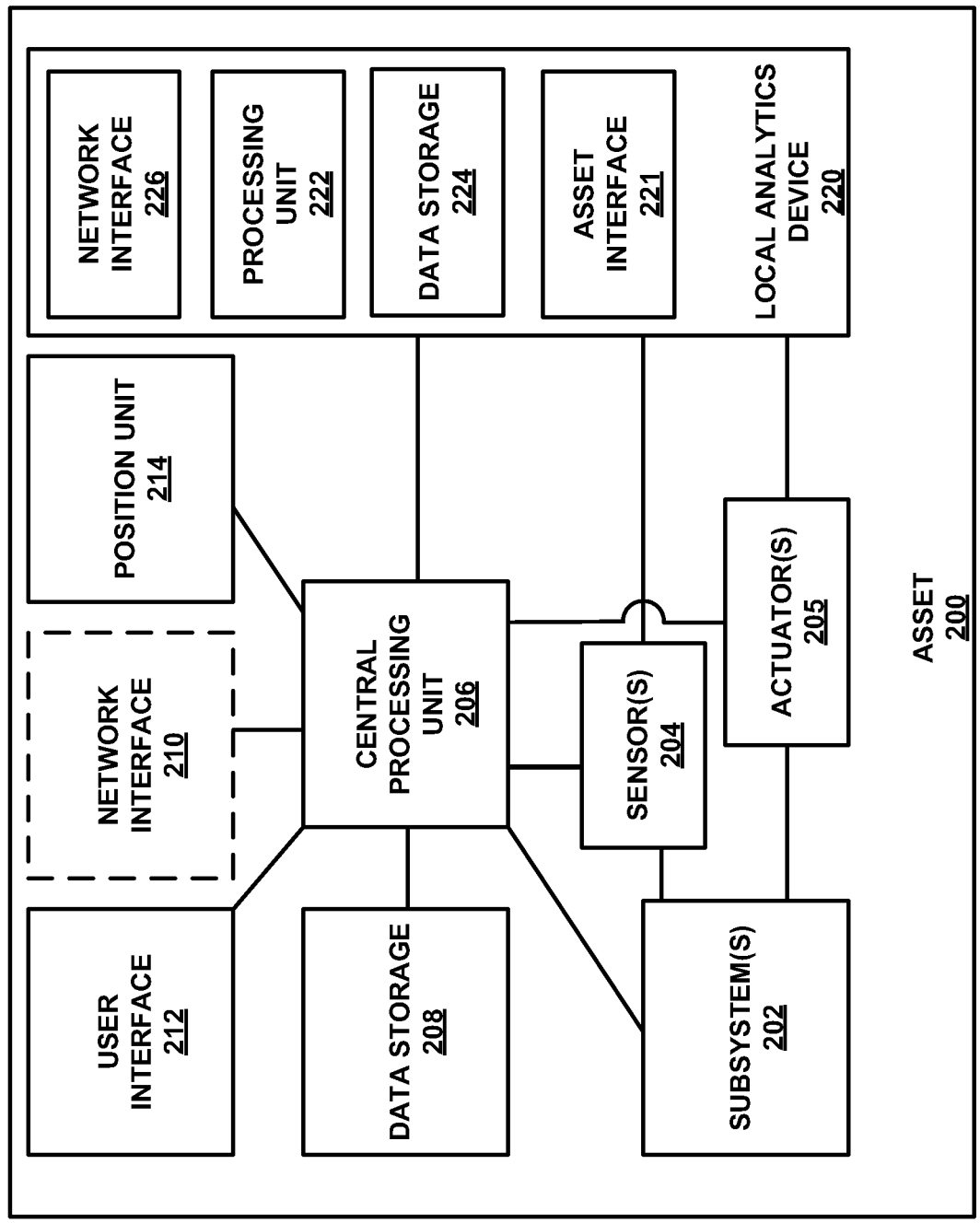
FIG. 2 depicts a simplified block diagram of an example asset.

Turning to FIG. 2, a simplified block diagram of an example asset 200 is depicted. Either or both of assets 106 and 108 from FIG. 1 may be configured like the asset 200. As shown, the asset 200 may include one or more subsystems 202, one or more sensors 204, one or more actuators 205, a central processing unit 206, data storage 208, a network interface 210, a user interface 212, and a local analytics device 220, all of which may be communicatively linked (either directly or indirectly) by a system bus, network, or other connection mechanism. One of ordinary skill in the art will appreciate that the asset 200 may include additional components not shown and/or more or less of the depicted components.

Broadly speaking, the asset 200 may include one or more electrical, mechanical, and/or electromechanical components configured to perform one or more operations. In some cases, one or more components may be grouped into a given subsystem 202.

Generally, a subsystem 202 may include a group of related components that are part of the asset 200. A single subsystem 202 may independently perform one or more operations or the single subsystem 202 may operate along with one or more other subsystems to perform one or more operations. Typically, different types of assets, and even different classes of the same type of assets, may include different subsystems. Representative examples of subsystems are discussed above with reference to FIG. 1.

As suggested above, the asset 200 may be outfitted with various sensors 204 that are configured to monitor operating conditions of the asset 200 and various actuators 205 that are configured to interact with the asset 200 or a component thereof and monitor operating conditions of the asset 200. In some cases, some of the sensors 204 and/or actuators 205 may be grouped based on a particular subsystem 202. In this way, the group of sensors 204 and/or actuators 205 may be configured to monitor operating conditions of the particular subsystem 202, and the actuators from that group may be configured to interact with the particular subsystem 202 in some way that may alter the subsystem's behavior based on those operating conditions.

In general, a sensor 204 may be configured to detect a physical property, which may be indicative of one or more operating conditions of the asset 200, and provide an indication, such as an electrical signal (e.g., "signal data"), of the detected physical property. In operation, the sensors 204 may be configured to obtain measurements continuously, periodically (e.g., based on a sampling frequency), and/or in response to some triggering event. In some examples, the sensors 204 may be preconfigured with operating parameters for performing measurements and/or may perform measurements in accordance with operating parameters provided by the central processing unit 206 (e.g., sampling signals that instruct the sensors 204 to obtain measurements). In examples, different sensors 204 may have different operating parameters (e.g., some sensors may sample based on a first frequency, while other sensors sample based on a second, different frequency). In any event, the sensors 204 may be configured to transmit electrical signals indicative of a measured physical property to the central processing unit 206. The sensors 204 may continuously or periodically provide such signals to the central processing unit 206.

For instance, sensors 204 may be configured to measure physical properties such as the location and/or movement of the asset 200, in which case the sensors may take the form of GNSS sensors, dead-reckoning-based sensors, accelerometers, gyroscopes, pedometers, magnetometers, or the like.

Additionally, various sensors 204 may be configured to measure other operating conditions of the asset 200, examples of which may include temperatures, pressures, speeds, acceleration or deceleration rates, friction, power usages, throttle positions, fuel usages, fluid levels, runtimes, voltages and currents, magnetic fields, electric fields, presence or absence of objects, positions of components, and power generation, among other examples. One of ordinary skill in the art will appreciate that these are but a few example operating conditions that sensors may be configured to measure. Additional or fewer sensors may be used depending on the industrial application or specific asset.

As suggested above, an actuator 205 may be configured similar in some respects to a sensor 204. Specifically, an actuator 205 may be configured to detect a physical property indicative of an operating condition of the asset 200 and provide an indication thereof in a manner similar to the sensor 204.

Moreover, an actuator 205 may be configured to interact with the asset 200, one or more subsystems 202, and/or some component thereof. As such, an actuator 205 may include a motor or the like that is configured to perform a mechanical operation (e.g., move) or otherwise control a component, subsystem, or system. In a particular example, an actuator may be configured to measure a fuel flow and alter the fuel flow (e.g., restrict the fuel flow), or an actuator may be configured to measure a hydraulic pressure and alter the hydraulic pressure (e.g., increase or decrease the hydraulic pressure). Numerous other example interactions of an actuator are also possible and contemplated herein.

Generally, the central processing unit 206 may include one or more processors and/or controllers, which may take the form of a general- or special-purpose processor or controller. In particular, in example implementations, the central processing unit 206 may be or include microprocessors, microcontrollers, application specific integrated circuits, digital signal processors, and the like. In turn, the data storage 208 may be or include one or more non-transitory computer-readable storage media, such as optical, magnetic, organic, or flash memory, among other examples.

The central processing unit 206 may be configured to store, access, and execute computer-readable program instructions stored in the data storage 208 to perform the operations of an asset described herein. For instance, as suggested above, the central processing unit 206 may be configured to receive respective sensor signals from the sensors 204 and/or actuators 205. The central processing unit 206 may be configured to store sensor and/or actuator data in and later access it from the data storage 208. Additionally, the central processing unit 206 may be configured to access and/or generate data reflecting the configuration of the asset (e.g., model number, asset age, software versions installed, etc.).

The central processing unit 206 may also be configured to determine whether received sensor and/or actuator signals trigger any abnormal-condition indicators, such as fault codes, which is a form of fault data. For instance, the central processing unit 206 may be configured to store in the data storage 208 abnormal-condition rules, each of which include a given abnormal-condition indicator representing a particular abnormal condition and respective triggering criteria that trigger the abnormal-condition indicator. That is, each abnormal-condition indicator corresponds with one or more sensor and/or actuator measurement values that must be satisfied before the abnormal-condition indicator is triggered. In practice, the asset 200 may be pre-programmed with the abnormal-condition rules and/or may receive new abnormal-condition rules or updates to existing rules from a computing system, such as the asset data platform 102.

In any event, the central processing unit 206 may be configured to determine whether received sensor and/or actuator signals trigger any abnormal-condition indicators. That is, the central processing unit 206 may determine whether received sensor and/or actuator signals satisfy any triggering criteria. When such a determination is affirmative, the central processing unit 206 may generate abnormal-condition data and then may also cause the asset's network interface 210 to transmit the abnormal-condition data to the asset data platform 102 and/or cause the asset's user interface 212 to output an indication of the abnormal condition, such as a visual and/or audible alert. Additionally, the central processing unit 206 may log the occurrence of the abnormal-condition indicator being triggered in the data storage 208, perhaps with a timestamp.

Figure 3:
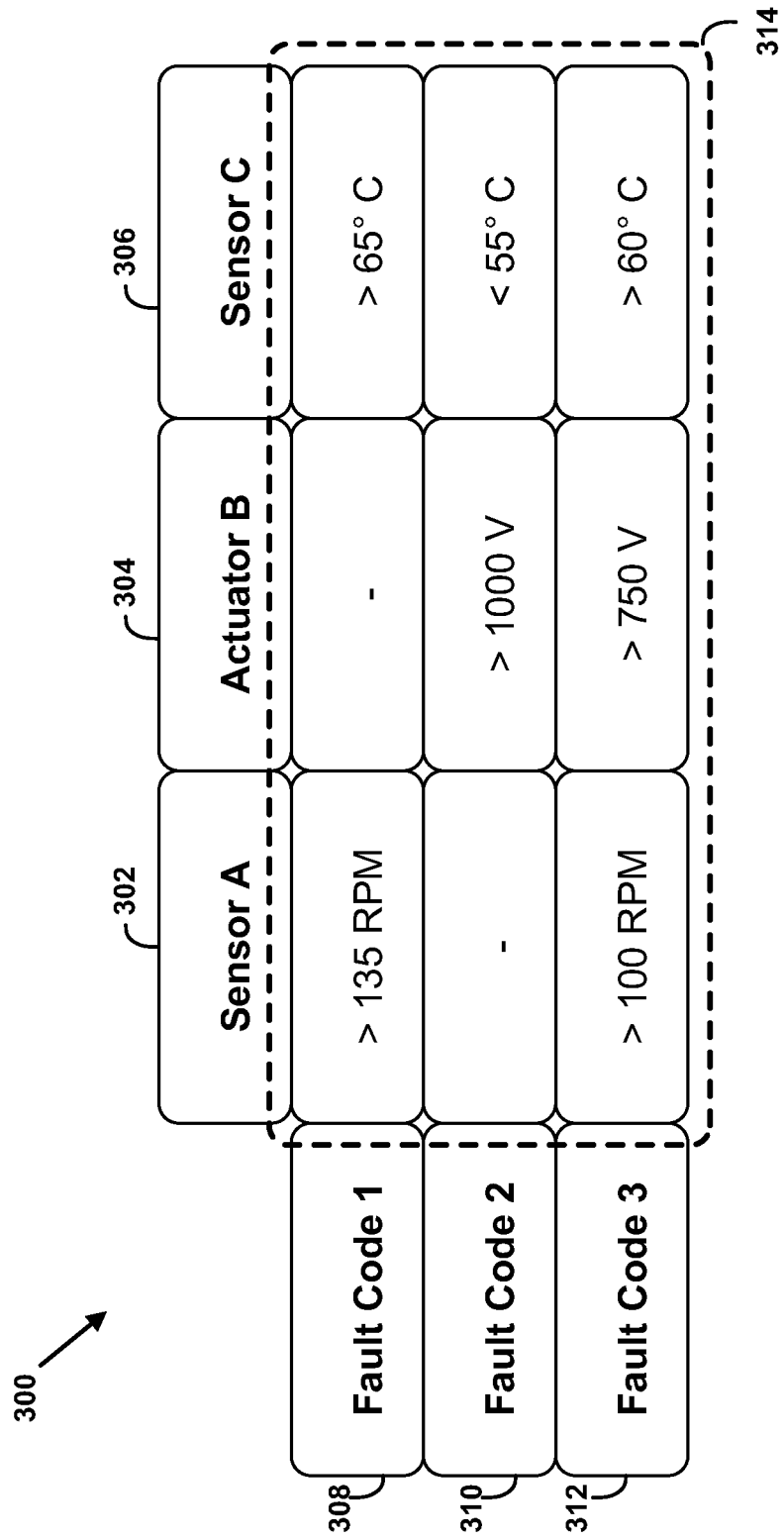
FIG. 3 depicts a conceptual illustration of example abnormal-condition indicators and triggering criteria.

FIG. 3 depicts a conceptual illustration of example abnormal-condition indicators and respective triggering criteria for an asset. In particular, FIG. 3 depicts a conceptual illustration of example fault codes. As shown, table 300 includes columns 302, 304, and 306 that correspond to Sensor A, Actuator B, and Sensor C, respectively, and rows 308, 310, and 312 that correspond to Fault Codes 1, 2, and 3, respectively. Entries 314 then specify sensor criteria (e.g., sensor value thresholds) that correspond to the given fault codes.

For example, Fault Code 1 will be triggered when Sensor A detects a rotational measurement greater than 135 revolutions per minute (RPM) and Sensor C detects a temperature measurement greater than 65° Celsius (C), Fault Code 2 will be triggered when Actuator B detects a voltage measurement greater than 1000 Volts (V) and Sensor C detects a temperature measurement less than 55° C., and Fault Code 3 will be triggered when Sensor A detects a rotational measurement greater than 100 RPM, Actuator B detects a voltage measurement greater than 750 V, and Sensor C detects a temperature measurement greater than 60° C. One of ordinary skill in the art will appreciate that FIG. 3 is provided for purposes of example and explanation only and that numerous other fault codes and/or triggering criteria are possible and contemplated herein.

Referring back to FIG. 2, the central processing unit 206 may be configured to carry out various additional functions for managing and/or controlling operations of the asset 200 as well. For example, the central processing unit 206 may be configured to provide instruction signals to the subsystems 202 and/or the actuators 205 that cause the subsystems 202 and/or the actuators 205 to perform some operation, such as modifying a throttle position. Additionally, the central processing unit 206 may be configured to modify the rate at which it processes data from the sensors 204 and/or the actuators 205, or the central processing unit 206 may be configured to provide instruction signals to the sensors 204 and/or actuators 205 that cause the sensors 204 and/or actuators 205 to, for example, modify a sampling rate. Moreover, the central processing unit 206 may be configured to receive signals from the subsystems 202, the sensors 204, the actuators 205, the network interfaces 210, and/or the user interfaces 212 and based on such signals, cause an operation to occur. Further still, the central processing unit 206 may be configured to receive signals from a computing device, such as a diagnostic device, that cause the central processing unit 206 to execute one or more diagnostic tools in accordance with diagnostic rules stored in the data storage 208. Other functionalities of the central processing unit 206 are discussed below.

The network interface 210 may be configured to provide for communication between the asset 200 and various network components connected to the communication network 104. For example, the network interface 210 may be configured to facilitate wireless communications to and from the communication network 104 and may thus take the form of an antenna structure and associated equipment for transmitting and receiving various over-the-air signals. Other examples are possible as well. In practice, the network interface 210 may be configured according to a communication protocol, such as but not limited to any of those described above.

The user interface 212 may be configured to facilitate user interaction with the asset 200 and may also be configured to facilitate causing the asset 200 to perform an operation in response to user interaction. Examples of user interfaces 212 include touch-sensitive interfaces, mechanical interfaces (e.g., levers, buttons, wheels, dials, keyboards, etc.), and other input interfaces (e.g., microphones), among other examples. In some cases, the user interface 212 may include or provide connectivity to output components, such as display screens, speakers, headphone jacks, and the like.

The local analytics device 220 may generally be configured to receive and analyze data related to the asset 200 and based on such analysis, may cause one or more operations to occur at the asset 200. For example, the local analytics device 220 may receive operating data for the asset 200 (e.g., signal data generated by the sensors 204 and/or actuators 205) and based on such data, may provide instructions to the central processing unit 206, the sensors 204, and/or the actuators 205 that cause the asset 200 to perform an operation. In another example, the local analytics device 220 may receive location data from the position unit 214 and based on such data, may modify how it handles predictive models and/or workflows for the asset 200. Other example analyses and corresponding operations are also possible.

To facilitate some of these operations, the local analytics device 220 may include one or more asset interfaces that are configured to couple the local analytics device 220 to one or more of the asset's on-board systems. For instance, as shown in FIG. 2, the local analytics device 220 may have an interface to the asset's central processing unit 206, which may enable the local analytics device 220 to receive data from the central processing unit 206 (e.g., operating data that is generated by sensors 204 and/or actuators 205 and sent to the central processing unit 206) and then provide instructions to the central processing unit 206. In this way, the local analytics device 220 may indirectly interface with and receive data from other on-board systems of the asset 200 (e.g., the sensors 204 and/or actuators 205) via the central processing unit 206. Additionally or alternatively, as shown in FIG. 2, the local analytics device 220 could have an interface to one or more sensors 204 and/or actuators 205, which may enable the local analytics device 220 to communicate directly with the sensors 204 and/or actuators 205. The local analytics device 220 may interface with the on-board systems of the asset 200 in other manners as well, including the possibility that the interfaces illustrated in FIG. 2 are facilitated by one or more intermediary systems that are not shown.

In practice, the local analytics device 220 may enable the asset 200 to locally perform advanced analytics and associated operations, such as executing a predictive model and corresponding workflow, that may otherwise not be able to be performed with the other on-asset components. As such, the local analytics device 220 may help provide additional processing power and/or intelligence to the asset 200.

It should be understood that the local analytics device 220 may also be configured to cause the asset 200 to perform operations that are not related to a predictive model. For example, the local analytics device 220 may receive data from a remote source, such as the asset data platform 102 or the output system 112, and based on the received data cause the asset 200 to perform one or more operations. One particular example may involve the local analytics device 220 receiving a firmware update for the asset 200 from a remote source and then causing the asset 200 to update its firmware. Another particular example may involve the local analytics device 220 receiving a diagnosis instruction from a remote source and then causing the asset 200 to execute a local diagnostic tool in accordance with the received instruction. Numerous other examples are also possible.

As shown, in addition to the one or more asset interfaces discussed above, the local analytics device 220 may also include a processing unit 222, a data storage 224, and a network interface 226, all of which may be communicatively linked by a system bus, network, or other connection mechanism. The processing unit 222 may include any of the components discussed above with respect to the central processing unit 206. In turn, the data storage 224 may be or include one or more non-transitory computer-readable storage media, which may take any of the forms of computer-readable storage media discussed above.

The processing unit 222 may be configured to store, access, and execute computer-readable program instructions stored in the data storage 224 to perform the operations of a local analytics device described herein. For instance, the processing unit 222 may be configured to receive respective sensor and/or actuator signals generated by the sensors 204 and/or actuators 205 and may execute a predictive model and corresponding workflow based on such signals. Other functions are described below.

The network interface 226 may be the same or similar to the network interfaces described above. In practice, the network interface 226 may facilitate communication between the local analytics device 220 and the asset data platform 102.

In some example implementations, the local analytics device 220 may include and/or communicate with a user interface that may be similar to the user interface 212. In practice, the user interface may be located remote from the local analytics device 220 (and the asset 200). Other examples are also possible.

While FIG. 2 shows the local analytics device 220 physically and communicatively coupled to its associated asset (e.g., the asset 200) via one or more asset interfaces, it should also be understood that this might not always be the case. For example, in some implementations, the local analytics device 220 may not be physically coupled to its associated asset and instead may be located remote from the asset 200. In an example of such an implementation, the local analytics device 220 may be wirelessly, communicatively coupled to the asset 200. Other arrangements and configurations are also possible.

For more detail regarding the configuration and operation of a local analytics device, please refer to U.S. App. Ser. No. 14/963,207, which is incorporated by reference herein in its entirety.

One of ordinary skill in the art will appreciate that the asset 200 shown in FIG. 2 is but one example of a simplified representation of an asset and that numerous others are also possible. For instance, other assets may include additional components not pictured and/or more or less of the pictured components. Moreover, a given asset may include multiple, individual assets that are operated in concert to perform operations of the given asset. Other examples are also possible.

III. Example Platform

Figure 4:
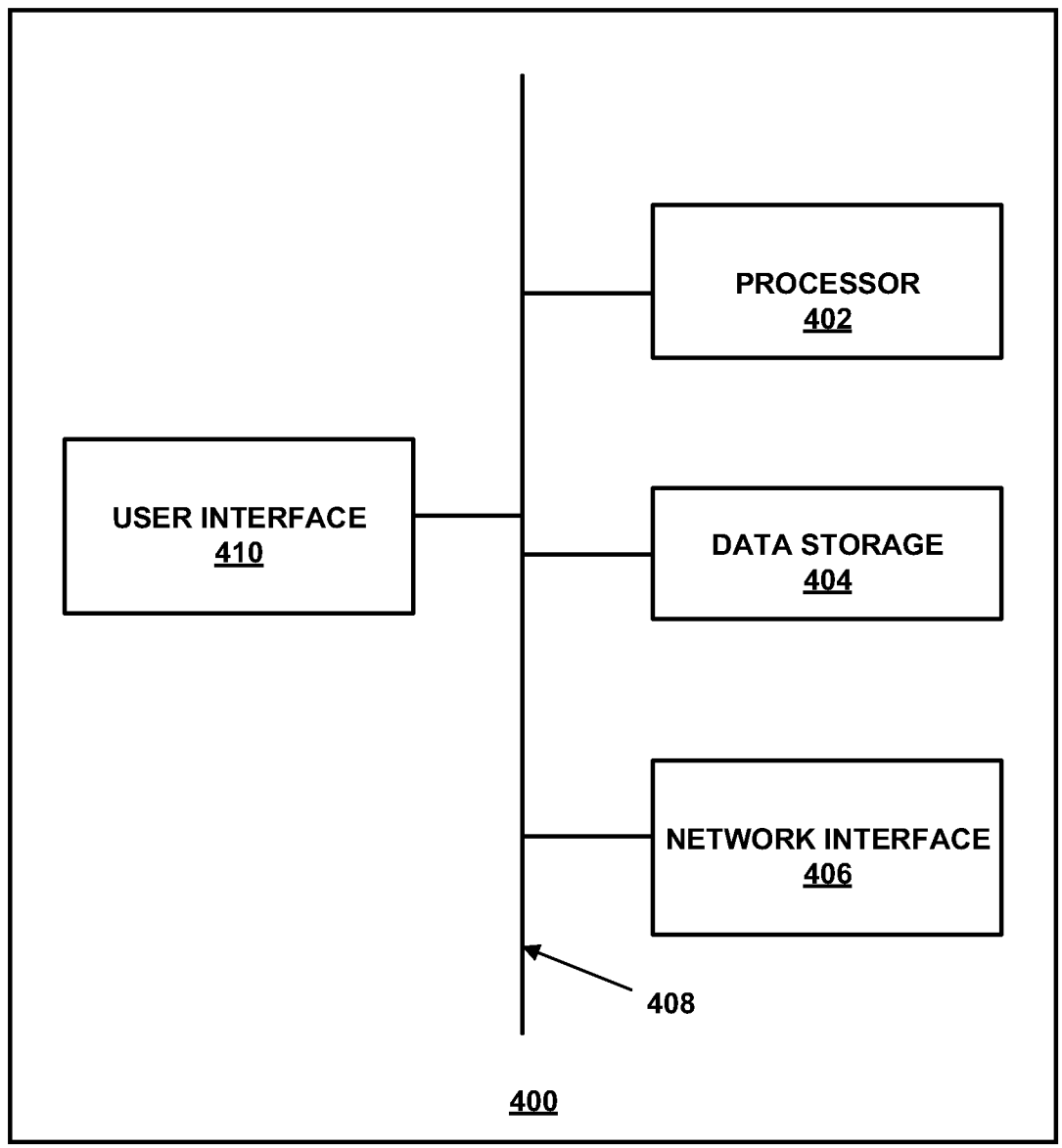
FIG. 4 depicts a simplified block diagram of an example analytics system.

FIG. 4 is a simplified block diagram illustrating some components that may be included in an example data asset platform 400 from a structural perspective. In line with the discussion above, the data asset platform 400 may generally comprise one or more computer systems (e.g., one or more servers), and these one or more computer systems may collectively include at least a processor 402, data storage 404, network interface 406, and perhaps also a user interface 410, all of which may be communicatively linked by a communication link 408 such as a system bus, network, or other connection mechanism.

The processor 402 may include one or more processors and/or controllers, which may take the form of a general- or special-purpose processor or controller. In particular, in example implementations, the processing unit 402 may include microprocessors, microcontrollers, application-specific integrated circuits, digital signal processors, and the like.

In turn, data storage 404 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, an optical-storage device, etc.

As shown in FIG. 4, the data storage 404 may be provisioned with software components that enable the platform 400 to carry out the functions disclosed herein. These software components may generally take the form of program instructions that are executable by the processor 402, and may be arranged together into applications, software development kits, toolsets, or the like. In addition, the data storage 404 may also be provisioned with one or more databases that are arranged to store data related to the functions carried out by the platform, examples of which include time-series databases, document databases, relational databases (e.g., MySQL), key-value databases, and graph databases, among others. The one or more databases may also provide for poly-glot storage.

The network interface 406 may be configured to facilitate wireless and/or wired communication between the platform 400 and various network components via the communication network 104, such as assets 106 and 108, data source 110, and client station 112. As such, network interface 406 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wired and/or wireless communication. Network interface 406 may also include multiple network interfaces that support various different types of network connections, some examples of which may include Hadoop, FTP, relational databases, high frequency data such as OSI PI, batch data such as XML, and Base64. Other configurations are possible as well.

The example data asset platform 400 may also support a user interface 410 that is configured to facilitate user interaction with the platform 400 and may also be configured to facilitate causing the platform 400 to perform an operation in response to user interaction. This user interface 410 may include or provide connectivity to various input components, examples of which include touch-sensitive interfaces, mechanical interfaces (e.g., levers, buttons, wheels, dials, keyboards, etc.), and other input interfaces (e.g., microphones). Additionally, the user interface 410 may include or provide connectivity to various output components, examples of which may include display screens, speakers, headphone jacks, and the like. Other configurations are possible as well, including the possibility that the user interface 410 is embodied within a client station that is communicatively coupled to the example platform.

Figure 5:
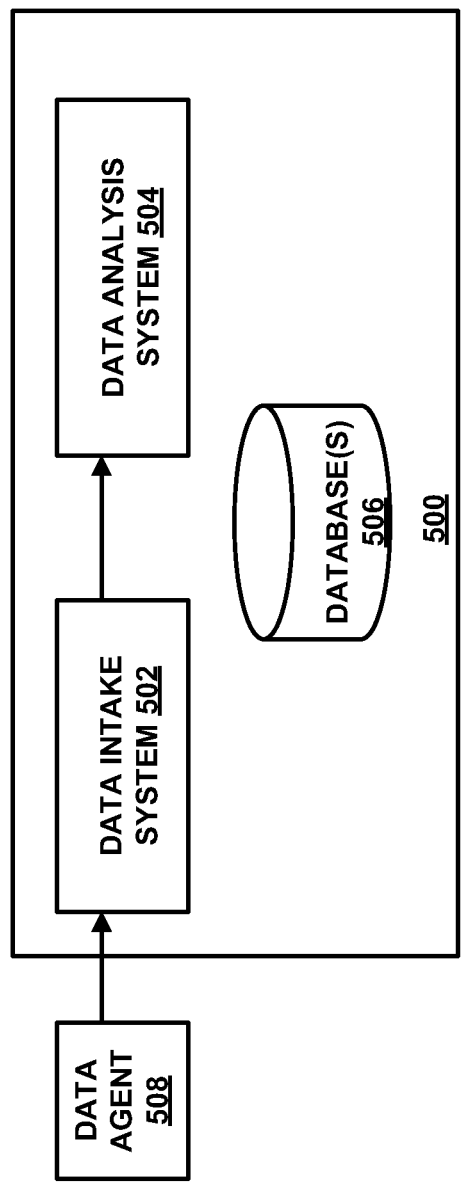
FIG. 5 depicts a functional block diagram of an example platform.

Referring now to FIG. 5, another simplified block diagram is provided to illustrate some components that may be included in an example platform 500 from a functional perspective. For instance, as shown, the example platform 500 may include a data intake system 502 and a data analysis system 504, each of which comprises a combination of hardware and software that is configured to carry out particular functions. The platform 500 may also include a plurality of databases 506 that are included within and/or otherwise coupled to one or more of the data intake system 502 and the data analysis system 504. In practice, these functional systems may be implemented on a single computer system or distributed across a plurality of computer systems.

The data intake system 502 may generally function to receive asset-related data and then provide at least a portion of the received data to the data analysis system 504. As such, the data intake system 502 may be configured to receive asset-related data from various sources, examples of which may include an asset, an asset-related data source, or an organization's existing platform/system. The data received by the data intake system 502 may take various forms, examples of which may include analog signals, data streams, and/or network packets. Further, in some examples, the data intake system 502 may be configured according to a given dataflow technology, such as a NiFi receiver or the like.

In some embodiments, before the data intake system 502 receives data from a given source (e.g., an asset, an organization's existing platform/system, an external asset-related data source, etc.), that source may be provisioned with a data agent 508. In general, the data agent 508 may be a software component that functions to access asset-related data at the given data source, place the data in the appropriate format, and then facilitate the transmission of that data to the platform 500 for receipt by the data intake system 502. As such, the data agent 508 may cause the given source to perform operations such as compression and/or decompression, encryption and/or de-encryption, analog-to-digital and/or digital-to-analog conversion, filtration, amplification, and/or data mapping, among other examples. In other embodiments, however, the given data source may be capable of accessing, formatting, and/or transmitting asset-related data to the example platform 500 without the assistance of a data agent.

The asset-related data received by the data intake system 502 may take various forms. As one example, the asset-related data may include data related to the attributes of an asset in operation, which may originate from the asset itself or from an external source. This asset attribute data may include asset operating data such as signal data (e.g., sensor and/or actuator data), fault data, asset location data, weather data, hotbox data, etc. In addition, the asset attribute data may also include asset configuration data, such as data indicating the asset's brand, make, model, age, software version, etc. As another example, the asset-related data may include certain attributes regarding the origin of the asset-related data, such as a source identifier, a timestamp (e.g., a date and/or time at which the information was obtained), and an identifier of the location at which the information was obtained (e.g., GPS coordinates). For instance, a unique identifier (e.g., a computer generated alphabetic, numeric, alphanumeric, or the like identifier) may be assigned to each asset, and perhaps to each sensor and actuator, and may be operable to identify the asset, sensor, or actuator from which data originates. These attributes may come in the form of signal signatures or metadata, among other examples. The asset-related data received by the data intake system 502 may take other forms as well.

The data intake system 502 may also be configured to perform various pre-processing functions on the asset-related data, in an effort to provide data to the data analysis system 504 that is clean, up to date, accurate, usable, etc.

For example, the data intake system 502 may map the received data into defined data structures and potentially drop any data that cannot be mapped to these data structures. As another example, the data intake system 502 may assess the reliability (or "health") of the received data and take certain actions based on this reliability, such as dropping certain any unreliable data. As yet another example, the data intake system 502 may "de-dup" the received data by identifying any data has already been received by the platform and then ignoring or dropping such data. As still another example, the data intake system 502 may determine that the received data is related to data already stored in the platform's databases 506 (e.g., a different version of the same data) and then merge the received data and stored data together into one data structure or record. As a further example, the data intake system 502 may identify actions to be taken based on the received data (e.g., CRUD actions) and then notify the data analysis system 504 of the identified actions (e.g., via HTTP headers). As still a further example, the data intake system 502 may split the received data into particular data categories (e.g., by placing the different data categories into different queues). Other functions may also be performed.

In some embodiments, it is also possible that the data agent 508 may perform or assist with certain of these pre-processing functions. As one possible example, the data mapping function could be performed in whole or in part by the data agent 508 rather than the data intake system 502. Other examples are possible as well.

The data intake system 502 may further be configured to store the received asset-related data in one or more of the databases 506 for later retrieval. For example, the data intake system 502 may store the raw data received from the data agent 508 and may also store the data resulting from one or more of the pre-processing functions described above. In line with the discussion above, the databases to which the data intake system 502 stores this data may take various forms, examples of include a time-series database, document database, a relational database (e.g., MySQL), a key-value database, and a graph database, among others. Further, the databases may provide for poly-glot storage. For example, the data intake system 502 may store the payload of received asset-related data in a first type of database (e.g., a time-series or document database) and may store the associated metadata of received asset-related data in a second type of database that permit more rapid searching (e.g., a relational database). In such an example, the metadata may then be linked or associated to the asset-related data stored in the other database which relates to the metadata. The databases 506 used by the data intake system 502 may take various other forms as well.

As shown, the data intake system 502 may then be communicatively coupled to the data analysis system 504. This interface between the data intake system 502 and the data analysis system 504 may take various forms. For instance, the data intake system 502 may be communicatively coupled to the data analysis system 504 via an API. Other interface technologies are possible as well.

In one implementation, the data intake system 502 may provide, to the data analysis system 504, data that falls into three general categories: (1) signal data, (2) event data, and (3) asset configuration data. The signal data may generally take the form of raw or aggregated data representing the measurements taken by the sensors and/or actuators at the assets. The event data may generally take the form of data identifying events that relate to asset operation, such as faults and/or other asset events that correspond to indicators received from an asset (e.g., fault codes, etc.), inspection events, maintenance events, repair events, fluid events, weather events, or the like. And asset configuration information may then include information regarding the configuration of the asset, such as asset identifiers (e.g., serial number, model number, model year, etc.), software versions installed, etc. The data provided to the data analysis system 504 may also include other data and take other forms as well.

The data analysis system 504 may generally function to receive data from the data intake system 502, analyze that data, and then take various actions based on that data. These actions may take various forms.

As one example, the data analysis system 504 may identify certain data that is to be output to a client station (e.g., based on a request received from the client station) and may then provide this data to the client station. As another example, the data analysis system 504 may determine that certain data satisfies a predefined rule and may then take certain actions in response to this determination, such as generating new event data or providing a notification to a user via the client station. As another example, the data analysis system 504 may use the received data to train and/or execute a predictive model related to asset operation, and the data analysis system 504 may then take certain actions based on the predictive model's output. As still another example, the data analysis system 504 may make certain data available for external access via an API.

In order to facilitate one or more of these functions, the data analysis system 504 may be configured to provide (or "drive") a user interface that can be accessed and displayed by a client station. This user interface may take various forms. As one example, the user interface may be provided via a web application, which may generally comprise one or more web pages that can be displayed by the client station in order to present information to a user and also obtain user input. As another example, the user interface may be provided via a native client application that is installed and running on a client station but is "driven" by the data analysis system 504. The user interface provided by the data analysis system 504 may take other forms as well.

In addition to analyzing the received data for taking potential actions based on such data, the data analysis system 504 may also be configured to store the received data into one or more of the databases 506. For example, the data analysis system 504 may store the received data into a given database that serves as the primary database for providing asset-related data to platform users.

In some embodiments, the data analysis system 504 may also support a software development kit (SDK) for building, customizing, and adding additional functionality to the platform. Such an SDK may enable customization of the platform's functionality on top of the platform's hardcoded functionality.

The data analysis system 504 may perform various other functions as well. Some functions performed by the data analysis system 504 are discussed in further detail below. One of ordinary skill in the art will appreciate that the example platform shown in FIGS. 4-5 is but one example of a simplified representation of the components that may be included in a platform and that numerous others are also possible. For instance, other platforms may include additional components not pictured and/or more or less of the pictured components. Moreover, a given platform may include multiple, individual platforms that are operated in concert to perform operations of the given platform. Other examples are also possible.

IV. Example Local Analytics Device

As noted above, an asset in example network configuration 100 may be equipped with a local analytics device, such as local analytics device 220, which may generally comprise a processing unit, data storage, a network interface, and one or more asset interfaces. Disclosed herein is an improved design of a local analytics device that is intended to balance factors such as processing capability, size, durability, ease of installation, tolerance to environmental conditions, manufacturing cost and time, etc.

Figure 6:
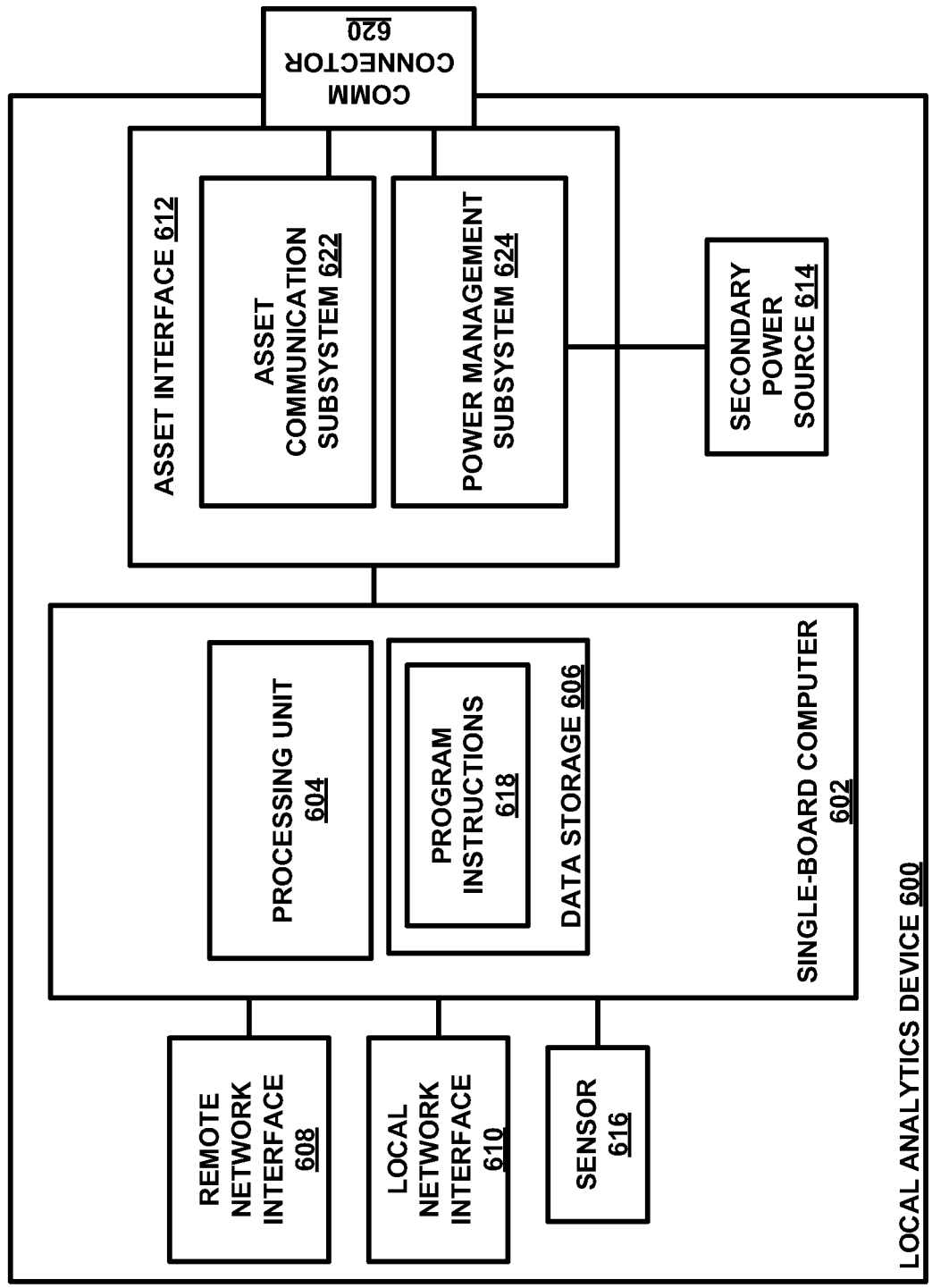
FIG. 6 depicts a simplified block diagram of an example local analytics device.

FIG. 6 is a simplified block diagram of an example local analytics device 600 designed in accordance with the present disclosure. As shown, the local analytics device 600 may include a single-board computer 602 with a high-capacity processing unit 604 and data storage 606, a remote network interface 608, a local network interface 610, an asset interface 612, a secondary power source 614, and one or more sensors 616, all of which may be packaged together into a single housing and communicatively linked (either directly or indirectly) by a system bus, network, or other connection mechanism. One of ordinary skill in the art will appreciate that the local analytics device 600 may include additional components not shown and/or more or less of the depicted components.

Broadly speaking, the local analytics device 600 may be comprised of a combination of hardware components (e.g., electrical, mechanical, and/or electromechanical components) and/or software components configured to perform one or more operations. In some cases, one or more components may be grouped into a subsystem or a single component.

In some embodiments, one or more components of the local analytics device 600 may include open-source components that facilitate easier modification and/or incrementally updating of such components. In turn, open-source components may simplify assembly of the local analytics device 600 while providing a scalable and cost-effective solution.

The single-board computer 602 of the local analytics device 600 may take various forms. For instance, the high-capacity processing unit 604 of the single-board computer 602 may comprise one or more processor components, such as general-purpose processors (e.g., a single-core or multi-core microprocessor), special-purpose processors (e.g., an application-specific integrated circuit or digital-signal processor), programmable logic devices (e.g., a field programmable gate array), and/or any other processor components now known or later developed, which provide sufficient processing capability to locally perform advanced analytics and associated operations. According to one example embodiment, the high-capacity processing unit 604 may comprise a multi-core processor having a clock speed of at least 1 GHz.

The data storage 606 of the single board computer 602 may comprise one or more non-transitory computer-readable storage mediums, such as volatile storage mediums (e.g., random access memory, registers, and/or cache) and/or non-volatile storage mediums (e.g., read-only memory, a hard-disk drive, a solid-state drive, flash memory, and/or an optical-storage device). According to example embodiments, the data storage 606 may include at least a 512 MB DDR3L RAM and/or a 4 GB flash memory with a dedicated flash memory controller (which may be embodied into an embedded Multi-Media Controller (eMMC)).

In practice, the single-board computer 602 may comprise a general-purpose computer that has been repurposed for use in a specific-purpose device, such as the local analytics device disclosed herein. One specific example of the single-board computer 602 for use in the local analytics device 600 may be a customizable BeagleBone Black board with a Sitara™ AM335xARM® Cortex®-A8 processor and an operating frequency of at least 1 GHz. However, one of ordinary skill in the art will appreciate that these are some examples of a single-board computer. Additional, alternative, or fewer components may be used depending on the industrial application or specific asset.

As further shown in FIG. 6, the data storage 606 may be provisioned with program instructions 618 that can be executed and/or interpreted by the processing unit 604 to cause the local analytics device 600 to carry out one or more of the functions disclosed herein. In practice, the program instructions 618 may take the form of firmware, executable files, or other types of software components and/or modules.

The remote network interface 608 of the local analytics device 600 may take various forms. In general, the remote network interface 608 may include at least one network interface that facilitates wireless communication between the local analytics device 600 and a remote computing system, such as the asset data platform 102. For instance, the wireless network interface 608 may include a cellular-network interface and/or a satellite-communication interface, among other examples. The remote network interface 608 may take other forms as well. (It should also be understood that communication with the remote computing system could also take place through an intermediary, and the network interface used in this case may be either a wireless interface or a wired interface such as an Ethernet interface).

The local network interface 610 of the local analytics device 600 may also take various forms. In general, the local network interface 610 may include at least one network interface that facilitates wireless and/or wired communication with local devices, such as mobile computing devices (e.g., mobile phones) located in proximity to the local analytics device 600. For instance, the local network interface 610 may include a Wi-Fi interface, Bluetooth® interface, and/or an Ethernet interface, among other examples. The local network interface 610 may take other forms as well.

In some examples, the remote network interface 608 and/or the local network interface 610 may also include and/or be coupled to an encryption device that facilitates secured communication between the local analytics device 600 and other devices and/or systems. The wireless network interface 608 may take other forms as well.

In some examples, the local analytics device 600 may also be configured to communicate with a remote computing system via the local network interface 610 in certain circumstances. For instance, if the local analytics device 600 determines that network connectivity with the remote computing system is not available (e.g., due to poor network conditions, a component failure, or the like), the local analytics device 600 may send data intended for the remote computing system through the local network interface 610 to a local device such as a gateway, which may in turn be configured to send the data to the remote computing system (e.g., via a wide area network such as the Internet).

Referring again to FIG. 6, the asset interface 612 of the local analytics device 600 generally takes the form of hardware and/or software that enables the local analytics device 600 to both engage in data communication with an asset and also draw power from the asset. For instance, as shown in FIG. 6, the asset interface 612 may include (i) a communication connector 620 that enables the local analytics device 600 to be coupled to the asset's on-board systems via a single cable, (ii) an asset communication subsystem 622 configured to manage communication with an asset's on-board systems, and (iii) a power management subsystem 624 configured to receive and manage power from the asset's on-board systems. Each of these components may take various forms, and may be connected and/or integrated together in various manners.

The communication connector 620 may be any physical connector that is configured to accept one end of a single cable that couples to an asset's on-board systems and carries both data and power. Depending on the implementation of the local analytics device 600, this communication connector 620 may take various forms. As examples, the communication connector 620 may include a Controller Area Network (CAN) connector, a Modbus connector, an Open Platform Communications (OPC) connector, an Ethernet connector, and/or a Universal Serial Bus (USB) connector, among others. It should also be understood that in some implementations, the local analytics device 600 may be configured to communicate wirelessly with an asset (e.g., via industrial, scientific and medical (ISM) radio bands such as the 433 MHz ISM band), in which case the asset interface 612 may include a wireless interface as an alternative to (or in addition to) the communication connector 620.

The asset communication subsystem 622, in turn, may include hardware and/or software components that are configured to facilitate communication between the single-board computer 602 and an asset's on-board systems via the communication connector 620. For example, the asset communication subsystem 622 may be configured to receive operating data from an asset's on-board systems via the communication connector 620, prepare the operating data for receipt by the single-board computer 602, and then pass the operating data to the single-board computer 602 (which may then use the data to perform analytics operations such as those disclosed herein). As another example, the asset communication subsystem 622 may be configured to receive instructions from the single-board computer 602, prepare the instructions for receipt by the asset's on-board systems, and then send the instructions to the asset's on-board systems via the communication connector 620. The asset communication subsystem 622 may manage other types of communication between the single-board computer 602 and the asset's on-board systems as well.

Further, the power management subsystem 624 may include hardware and/or software components that are configured to receive power supplied by the asset's on-board systems via the communication connector 620, "condition" the received power so that it can be used by the single-board computer 602, and then supply the power to the single-board computer 602. Such components may include power converters and regulators to protect the single-board computer from abnormal power system conditions associated with the asset, among other examples.

In addition, the power management subsystem 624 may include hardware and/or software components that are configured to switch the local analytics device's power source from the power supplied by the asset's on-board systems to the secondary power source 614 that is internal to the local analytics device 600 (e.g., one or more internal batteries). For example, the power management subsystem 624 may include a power path management component that is configured to switch power consumption from the asset to the secondary power source in certain circumstances, such as when no power is being supplied by the asset or abnormal power conditions are detected. Subsequent to a switch in the local analytics device's power source, the single-board computer 602 may also be configured to take various other actions, such as notifying a user of the switch and/or initiating graceful shutdown of the local analytics device after a particular duration of time.

In some embodiments, the asset interface 612 may also include hardware and/or software that enables the asset interface 612 to automatically reconfigure the electric interface of the communication connector 620, such that the communication connector 620 can connect to cables in different orientations. For example, the asset interface 612 may be configured to detect the signals being received over the cable via the communication connector 620, determine the orientation of the cable based on the detected signals, and then if necessary, reconfigure the electric interface of the communication connector 620 to match the determined orientation of the cable. The hardware and/or software for performing this reconfiguration could be integrated in whole or in part with other components of the asset interface 612, such as the communication connector 620 and/or the asset communication subsystem 622.

The asset interface's components may be implemented in various manners. In one example, the asset interface's components may be implemented on a separate circuit board that couples to the single-board computer 602. In another example, the asset interface's components may be implemented as part of the same circuit board as the single-board computer 602. Other example implementations are possible.

As noted above, the asset interface 612 may be configured according to various technologies and/or protocols for interfacing with an asset, examples of which may include CAN interface technology, Modbus interface technology, OPC interface technology, Ethernet interface technology, USB interface technology, and technology for wirelessly communicating with assets ISM radio bands such as the 433 MHz ISM band.

Figure 7:
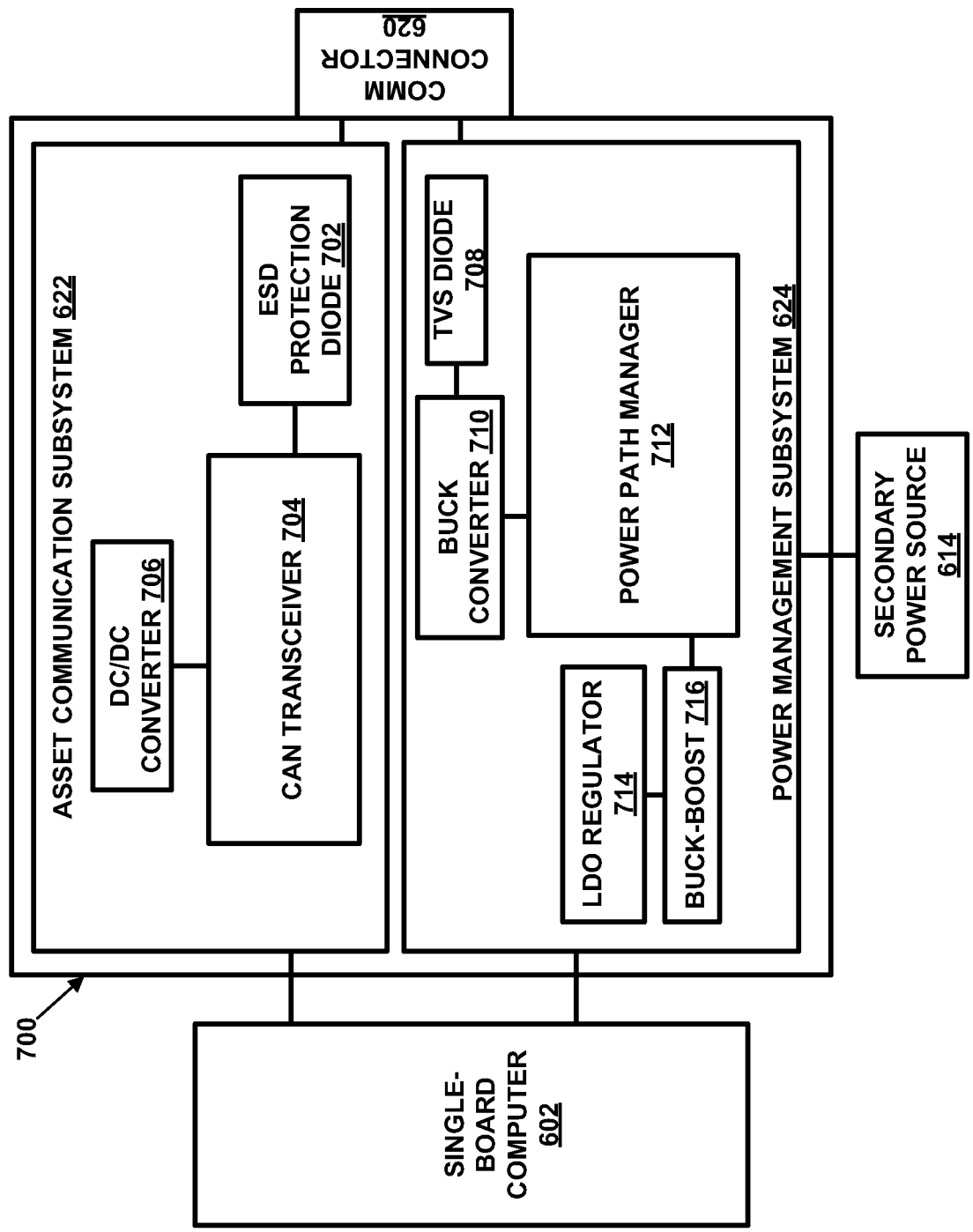
FIG. 7 depicts a simplified block diagram of an example asset interface of a local analytics device.

FIG. 7 is a simplified block diagram of one possible example of an asset interface 700 that may be included in the local analytics device 600. As shown, the example asset interface 700 may include (i) a communication connector 620 that can couple to an asset's on-board systems via a single cable, (ii) an example asset communication subsystem 622 that includes an electrostatic discharge (ESD) protection diode 702, a CAN transceiver 704, and a DC/DC converter 706, and (iii) a power management subsystem 624 that includes a transient-voltage-suppression (TVS) diode 708, a buck converter 710, a power path manager 712, a LDO regulator 714, and a buck-boost 716. The example asset interface 700 may include other components as well.

In line with the discussion above, the communication connector 620 may be any physical connector that is configured to accept one end of a single cable that couples to an asset's on-board systems and carries both data and power. As one possible example, the communication connector 620 may be a CAN connector that is configured to accept one end of a CAN-Bus cable, such as a cable compliant with SAE J1939 and/or J1708.

Figure 8:
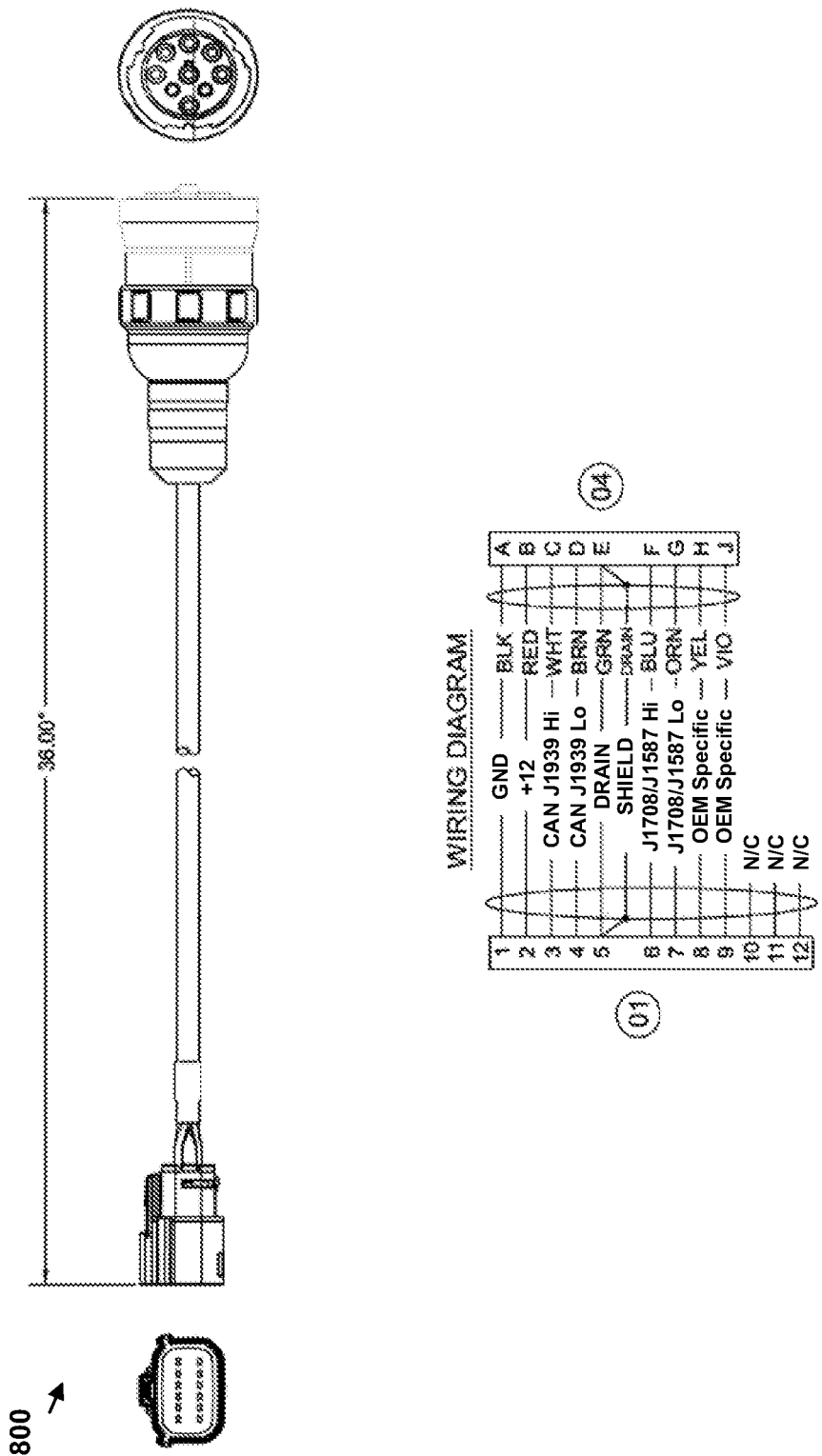
FIG. 8 depicts an example cable that may be used to couple a local analytics device to an asset.

FIG. 8 shows one possible example of such a cable 800, along with one possible example of a wiring diagram for the cable 800. As shown, the cable 800 may have on one side a 12-pin connector, which may be mated with the communication connector 620. On the other side, the cable 800 may have a 9-pin connector, which may be mated with an asset's on-board systems. The pins of the 12-pin connector and 9-pin connectors may then be wired as shown in the example wiring diagram. In practice, this cable 800 may provide a CAN-Bus interface with data rates from 250 kbps-1 Mbps. Further, the cable 800 may include secondary CAN connections for proprietary or secure data networks. It should be understood that the wiring type and ordering shown in the wiring diagram is merely one possible example, and that the cable 800 may have various other wiring configurations as well (including different wire ordering, different color codes, etc.). Further, it should be understood that the communication connector 620 may be configured to interface with one or more alternative cables compatible with a variety of assets, including OBD-II and CAT HD10 connector types.

Referring back to FIG. 7 and turning to the asset communication subsystem 622, the ESD protection diode 702 may be coupled between the communication connector 620 and the CAN transceiver 704 to provide ESD protection for communications received via the communication connector 620. As one particular example, this ESD protection diode 702 may take the form of a PESD1CAN-U CAN bus ESD protection diode from NXP® Semiconductors.

The CAN transceiver 704 of the asset communication subsystem 622 may generally facilitate communications between the local analytics device 600 and an asset. The CAN transceiver 704 may be comprised of one or more open source hardware components. As one particular example, the CAN transceiver 704 may be an ISO1050 CAN Transceiver from Texas Instruments Incorporated.

The DC/DC converter 706 of the asset communication subsystem 622 may be coupled to the CAN transceiver 704 and may be configured to convert direct current supplied by an asset from one voltage level to another. As one particular example, the DC/DC converter 706 may include an R1Z series DC/DC converter from RECOM Power GmbH.

Turning to the power management subsystem 624, as shown, the TVS diode 708 and the buck converter 710 may be coupled between the communication connector 620 and the power path manager 712. The TVS diode 708 may provide protection from voltage spikes in the power signal received from the asset's on-board systems, and the buck converter 710 may function as a step-down converter configured to step down voltage while stepping up current from the TVS diode 708 to the power path manager 712. As one particular example, the TVS diode 708 may include an SMF24A from Littlefuse, Inc., and the buck converter 710 may include a TPS54332 step-down converter from Texas Instruments Incorporated.

The power path manager 712 may be coupled to both the power source received from the asset's on-board systems (via the TVS diode 708 and the buck converter 710) and the secondary power source 614, and the power path manager 712 may be configured to select which of these power sources is supplied to the single-board computer 602. The power path manager 712 may perform this selection in various manners.

According to one implementation, the power path manager 712 may be configured to (i) supply the power source received from the asset's on-board systems by default and (ii) switch over to the secondary power source 614 in response to certain triggering events. For example, the power path manager 712 may be configured to switch over to the secondary power source 614 if there is no power signal being received from the asset's on-board systems or if there is an abnormal power condition detected. Other examples are possible as well. As part of this power path selection functionality, the power path manager 712 may also be configured to notify the single-board computer 602 when the power source has been changed, which may enable the single-board computer 602 to react accordingly (e.g., by initiating a graceful shutdown of the local analytics device 600 after a duration of time).

Additionally, the power path manager 712 may be configured to charge the secondary power source 614. For example, in situations when a power source is being received from the asset's on-board systems and the secondary power source 614 is not in use, the power path manager 712 may be configured to charge the secondary power source 614.

In general, the power path manager may take the form of a hardware component such as an integrated circuit that is programmed to carry out these operations. As one specific example, the power path manager 712 may comprise a BQ24075-Q1 Li-ion linear charger and system power path management device from Texas Instruments Incorporated.

The power path manager 712 may then be coupled to the single-board computer via the buck-boost converter 716 and LDO regulator 714. The buck-boost converter 716 may be configured to convert the source of the direct current from one voltage level to another, and the LDO regulator 714 may be configured to regulate the output voltage from the buck-boost converter 716. As one specific example, the LDO regulator 714 and buck-boost converter 716 may include components from Texas Instruments Incorporated, such as a TPS63002 buck-boost converter, and a TPS73033 Series LDO voltage regulator.

It should be understood that the asset interface 700 depicted in FIG. 7 is merely one possible example of an asset interface designed in accordance with the present disclosure, and that many other designs of asset interfaces are possible as well.

Referring back to FIG. 6, the secondary power source 614 may comprise one or more batteries. For example, the secondary power source 614 may include a nickel-hydrogen (NIH) battery. As another example, the secondary power source 614 may include a Low Maintenance Hybrid (LMH) battery. One of ordinary skill in the art will appreciate that other batteries, such as lithium-ion batteries, may be included depending on the industrial application, specific asset, and/or environmental conditions.

Further, the one or more sensors 616 may take various forms. In general, the one or more sensors 616 may be configured to measure attributes of the local analytics device 600, such as location and/or movement of the local analytics device 600, and then transmit electrical signals indicative of such measured attributes (e.g., sensor data) to the single-board computer 602. In turn the single-board computer 602 may use such sensor data for various purposes related to the operation of the local analytics device. The one or more sensors 616 may continuously or periodically provide such signals to the single board computer 602.

In some examples, one or more sensors 616 may be configured to measure physical properties such as the location and/or movement of the local analytics device 600 (or the asset), in which case the sensors may take the form of GNSS sensors, dead-reckoning-based sensors, accelerometers, gyroscopes, pedometers, magnetometers, GPS, eCompass, and the like.

In further examples, one or more sensors 616 may be configured to measure other conditions of the local analytics device 600 (or the asset), examples of which may include temperatures, pressures, speeds, acceleration or deceleration rates, friction, power usages, runtimes, voltages and currents, magnetic fields, electric fields, presence or absence of objects, positions of components, and power generation, among other examples.

Within examples, one or more sensors 616 may include a barometric pressure sensor, such as an MS8607-01BA from Measurement Specialties, Inc. and an accelerometer and magnetometer, such as an LSM303DLHC from STMicroelectronics. One of ordinary skill in the art will appreciate that these are but a few example sensors that may be included to measure certain operating conditions. Additional or fewer sensors may be used depending on the industrial application or specific asset.

In some example embodiments, the components within the local analytics device 600 may be coated in a conformal coating to protect the components from tampering and moisture damage. Additionally, components of the local analytics device 600 may be contained within the single housing 620 capable of protecting the components against contact, immersion in water, vibrations, temperature, and other environmental conditions (e.g., an IP67 chassis).

In some instances, it may be beneficial to include a single housing that may ease transportation and installation of the local analytics device. Components of the local analytics device 600 could be packaged together in the single housing to simplify assembly, reduce cost, and minimize footprint of the local analytics device 600.

Figure 9:
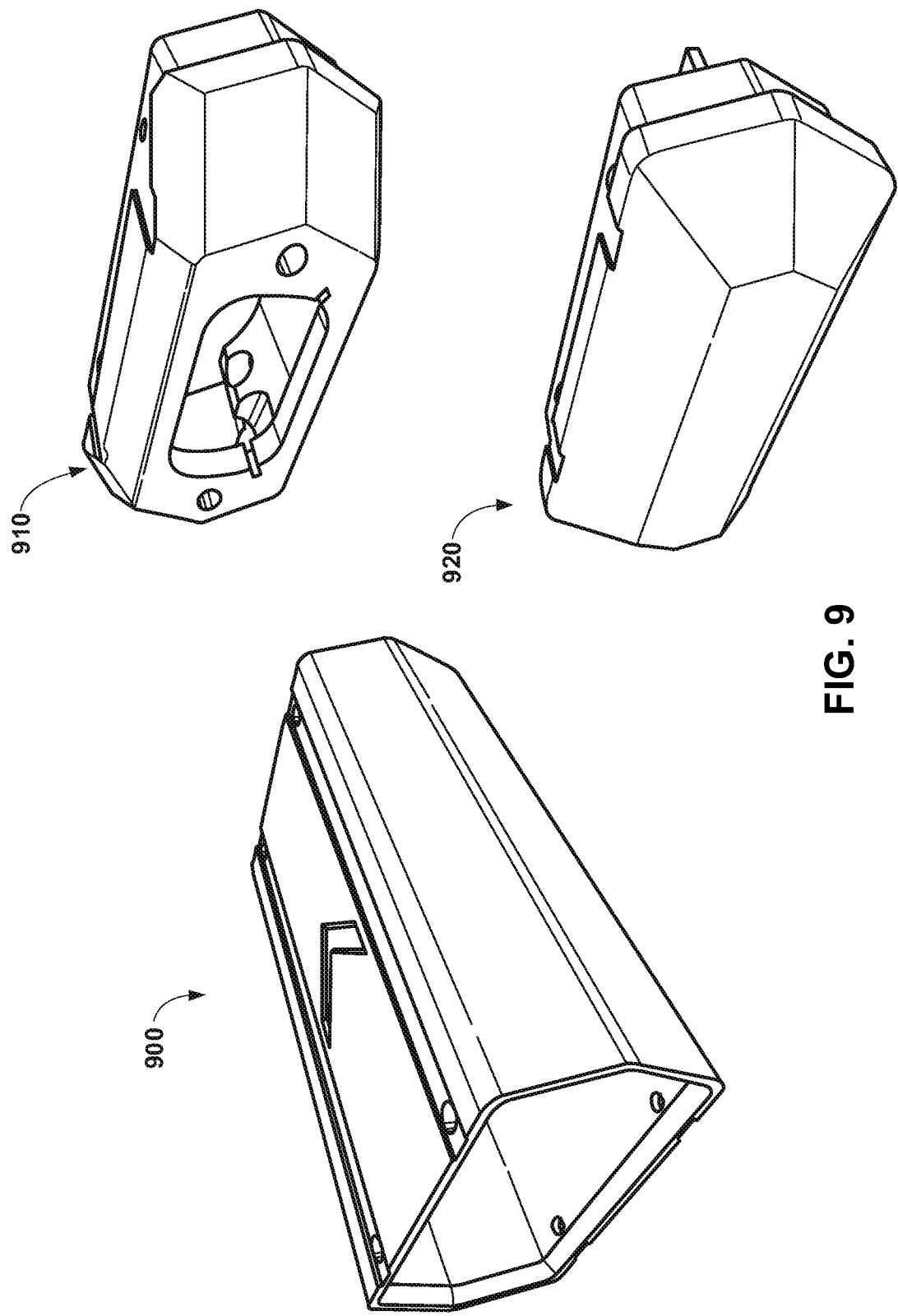
FIG. 9 depicts an example single housing of a local analytics device.

FIG. 9 shows one possible example of a housing for the local analytics device 600. As shown, the housing may comprise a main body portion 900 that connects to an open endcap 910 on one side and a closed endcap 920 on another side. In practice, the asset interface's communication connector (not shown) may be positioned in the open endcap 910, such that it can be easily accessed and connected to a cable that runs to the asset, while the local analytics device's other components may generally be positioned within the main body portion 900.

The local analytics device's housing could have various different shapes and sizes. For instance, as shown, the local analytics device's housing may be shaped like a handheld device for ease of transportation and installation. Further, the local analytics device's housing may be comprised of various different materials, which may be selected based on the intended environment of the local analytics device (e.g., interior vs. exterior of the asset) and the expected environmental conditions. As one possible example, the housing may be filled with an opaque non-conductive resin to provide vibration absorption protection during operation of the asset. Other examples are possible as well.

Additionally, the housing may include a mechanism for affixing the local analytics device to the asset. For example, the housing's exterior may include adhesive tape (not shown) that enables the local analytics device to be attached to an asset. The use of adhesive tape provides a cost-effective solution for installation without the need for professional installation or extra tools (e.g., mounting brackets). As another example, the housing's exterior may include mounting brackets to mount the local analytics device to the interior or exterior of the asset. Other examples are possible as well.

V. Example Operations

The local analytics device disclosed herein may be programmed to carry out various functions. For instance, upon installing a local analytics device at an asset, a provisioning process may be invoked to configure the local analytics device for communication with an asset data platform. The local analytics device may be programmed to perform various functions to facilitate this process. For example, the local analytics device may be programmed to participate in an asset discovery process to help identify the asset to which the local analytics device is coupled and then provide the results therefrom to a provisioning device (e.g., a mobile phone). As another example, the local analytics device may be programmed to receive one or more data-management credentials from the provisioning device (e.g., as a result of an authorized "log-in" attempt) and then utilize the data-management credential(s) to interact with the asset data platform on behalf of the asset. Other examples are possible as well. For further detail regarding the provisioning of a local analytics device, please refer to U.S. app. Ser. No. 15/370,225, which is incorporated by reference herein in its entirety.

The local analytics device may also be programmed to perform various functions after provisioning. As one example, the local analytics device may be programmed to locally execute predictive models and/or corresponding workflows based on data received from the asset via the asset interface. As another example, the local analytics device may be programmed to locally define and/or modify predictive models. As yet another example, the local analytics device may be programmed to publish data to the asset data platform on behalf of the asset, so that the asset data platform can then analyze and potentially take action based on that data. Many other examples are possible as well. For further detail regarding example operations of a local analytics device, please refer to U.S. app. Ser. No. 15/185,524, which is incorporated by reference herein in its entirety.

VI. Conclusion

Example embodiments of the disclosed innovations have been described above. Those skilled in the art will understand, however, that changes and modifications may be made to the embodiments described without departing from the true scope and sprit of the present invention, which will be defined by the claims.

Further, to the extent that examples described herein involve operations performed or initiated by actors, such as "humans", "operators", "users" or other entities, this is for purposes of example and explanation only. The claims should not be construed as requiring action by such actors unless explicitly recited in the claim language.

The invention claimed is:

1. A local analytics device comprising:
a single-board computer comprising a processing unit, data storage, and program instructions stored in the data storage;
a remote network interface configured to facilitate communication between the local analytics device and a remote computing system;
a local network interface configured to facilitate communication between the local analytics device and one or more local devices;
a secondary power source configured to supply power to the single-board computer; and
an asset interface coupled to the single-board computer, wherein the asset interface comprises (i) a communication connector configured to couple the local analytics device to an asset via a single cable, (ii) an asset communication subsystem configured to manage data communication between the single-board computer and the asset, and (iii) a power management subsystem configured to manage the power supplied to the single-board computer by selecting between a power source supplied by the asset and the secondary power source,
wherein the single-board computer, the remote network interface, the local network interface, the secondary power source, and the asset interface are packaged into a single housing, and
wherein the program instructions stored in the data storage of the single-board computer are executable by the processing unit of the single-board computer to cause the local analytics device to determine that network connectivity with the remote computing system via the remote network interface is not available and responsively send data intended for the remote computing system via the local network interface to an intermediary device.

2. The local analytics device of claim 1, wherein the processing unit comprises a high-capacity processor.

3. The local analytics device of claim 1, wherein the single-board computer comprises a general-purpose computer that has been repurposed for use in a specific-purpose device.

4. The local analytics device of claim 1, wherein the program instructions stored in the data storage of the single-board computer are executable by the processing unit of the single-board computer to cause the local analytics device to execute a predictive model based on data received from the asset via the communication connector.

5. The local analytics device of claim 1, wherein the remote network interface comprises at least one of a cellular-network interface or a satellite-communication interface.

6. The local analytics device of claim 1, wherein the local network interface comprises at least one of a Wi-Fi interface or a Bluetooth® interface.

7. The local analytics device of claim 1, wherein the communication connector comprises one of a Controller Area Network (CAN) connector, a Modbus connector, an Open Platform Communications (OPC) connector, an Ethernet connector, or a Universal Serial Bus (USB) connector.

8. The local analytics device of claim 1, wherein the asset communication subsystem comprises (i) a CAN transceiver, (ii) a DC/DC converter, and (iii) an electrostatic discharge (ESD) protection diode.

9. The local analytics device of claim 8, wherein the CAN transceiver is coupled to the communication connector via the ESD protection diode, wherein the DC/DC converter is coupled to the CAN transceiver, and wherein the CAN transceiver is coupled to the single-board computer.

10. The local analytics device of claim 1, wherein the power management subsystem comprises (i) a power path manager, (ii) a transient-voltage-suppression (TVS) diode, (iii) a buck converter, (iv) a buck-boost converter, and (v) a low-dropout (LDO) regulator.

11. The local analytics device of claim 10, wherein the power path manager is coupled to the communication connector via the TVS diode and the buck converter, wherein the power path manager is coupled to the single-board computer via the buck-boost converter and the LDO regulator, and wherein the power path manager is further coupled to the secondary power source.

12. The local analytics device of claim 10, wherein the power path manager is configured to detect that no power is being supplied by the asset and responsively switch the power supplied to the single-board computer from the power source supplied by the asset to the secondary power source.

13. The local analytics device of claim 10, wherein the power path manager is configured to:
   detect an abnormality in the power source supplied by the asset and responsively switch the power supplied to the single-board computer from the power source supplied by the asset to the secondary power source.

14. The local analytics device of claim 1, wherein the secondary power source comprises one or more batteries.

15. The local analytics device of claim 14, wherein the power management subsystem further comprises a battery charger configured to charge the one or more batteries.

16. The local analytics device of claim 1, further comprising one or more sensors coupled to the single-board computer, wherein the one or more sensors are configured to measure attributes of the local analytics device.

17. The local analytics device of claim 16, wherein the one or more sensors comprise at least one of a temperature sensor, an eCompass, an accelerometer, or a barometer.

18. The local analytics device of claim 1, further comprising an adhesive tape affixed to the exterior of the single housing.

19. A local analytics device comprising:
   a single-board computer comprising a processing unit, data storage, and program instructions stored in the data storage;
   a remote network interface configured to facilitate wireless communication between the local analytics device and a remote computing system;
   a local network interface configured to facilitate wireless communication between the local analytics device and one or more local devices;
   a secondary power source configured to supply power to the single-board computer;
   an asset interface coupled to the single-board computer, wherein the asset interface comprises:
      a Controller Area Network (CAN) connector configured to couple the local analytics device to an asset via a single cable;
      an asset communication subsystem configured to manage communication between the single-board computer and the asset, wherein the asset communication subsystem comprises (i) a CAN transceiver, (ii) a DC/DC converter, and (iii) an electrostatic discharge (ESD) protection diode, wherein the CAN transceiver is coupled to the CAN connector via the ESD protection diode, the DC/DC converter is coupled to the CAN transceiver, and the CAN transceiver is coupled to the single-board computer; and
   a power management subsystem configured to manage the power supplied to the single-board computer by selecting between a power source supplied by the asset and the secondary power source, wherein the power management subsystem comprises (i) a power path manager, (ii) a transient-voltage-suppression (TVS) diode, (iii) a buck converter, a (iv) buck-boost converter, and (v) a low-dropout (LDO) regulator; and
   one or more sensors coupled to the single-board computer, wherein the one or more sensors are configured to measure attributes of the local analytics device,
   wherein the single-board computer, the remote network interface, the local network interface, the secondary power source, the asset interface, and the one or more sensors are packaged together into a single housing, and
   wherein the program instructions stored in the data storage are executable by the processing unit to cause the local analytics device to execute a predictive model based on data received from the asset via the CAN connector.

* * * * *